US011465741B2

(12) United States Patent
Smith et al.

(10) Patent No.: US 11,465,741 B2
(45) Date of Patent: Oct. 11, 2022

(54) DEPLOYABLE AERIAL COUNTERMEASURES FOR NEUTRALIZING AND CAPTURING TARGET AERIAL VEHICLES

(71) Applicant: Sarcos Corp., Salt Lake City, UT (US)

(72) Inventors: Fraser M. Smith, Salt Lake City, UT (US); Marc X. Olivier, Salt Lake City, UT (US)

(73) Assignee: Sarcos Corp., Salt Lake City, UT (US)

( * ) Notice: Subject to any disclaimer, the term of this patent is extended or adjusted under 35 U.S.C. 154(b) by 654 days.

(21) Appl. No.: 16/151,279

(22) Filed: Oct. 3, 2018

(65) Prior Publication Data
US 2020/0108922 A1  Apr. 9, 2020

(51) Int. Cl.
*B64C 39/02* (2006.01)
*F41H 11/02* (2006.01)
(Continued)

(52) U.S. Cl.
CPC ............ *B64C 39/024* (2013.01); *F41H 11/02* (2013.01); *G05D 1/101* (2013.01); *G05D 1/12* (2013.01);
(Continued)

(58) Field of Classification Search
CPC ........... B64C 2201/12; B64C 2201/182; F41H 11/02; F41H 11/04; G05D 1/101; G05D 1/12
See application file for complete search history.

(56) References Cited

U.S. PATENT DOCUMENTS 4,240,601 A   12/1980   Reed
6,119,976 A   9/2000    Rogers
(Continued)

FOREIGN PATENT DOCUMENTS

DE   102015003323 A1   9/2016
FR   2965908 A1        4/2012
(Continued)

OTHER PUBLICATIONS

International Search Report for International Application No. PCT/US2019/054552 dated Jan. 13, 2020, 20 pages.
(Continued)

*Primary Examiner* — Philip J Bonzell

(57) ABSTRACT

A counter-attack unmanned aerial vehicle (UAV), for aerial neutralization of a detected target aerial vehicle, comprises a flight body and a flight control system to intercept the detected target aerial vehicle, and comprises an aerial vehicle capture countermeasure (e.g., a net) operable to capture the detected target aerial vehicle. The aerial vehicle capture countermeasure can comprise a net deployable from the counter-attack UAV, and a captured target aerial vehicle can be delivered to a particular location. A system for aerial neutralization of a detected target aerial vehicle comprises an aerial vehicle detection system comprising at least one detection sensor operable to detect the target aerial vehicle, and operable to provide command data (including location data) to at least one counter-attack UAV for neutralization of the target aerial vehicle. The counter-attack UAV and systems may be autonomously operated. Associated systems and methods are provided.

36 Claims, 9 Drawing Sheets

(51) Int. Cl.
    *G05D 1/12*    (2006.01)
    *G05D 1/10*    (2006.01)
(52) U.S. Cl.
    CPC .... *B64C 2201/12* (2013.01); *B64C 2201/182* (2013.01)

(56) References Cited

U.S. PATENT DOCUMENTS

| | | | |
|---|---|---|---|
| 6,392,213 B1 | 5/2002 | Martorana et al. | |
| 8,146,855 B2 | 4/2012 | Ismailov | |
| 9,085,362 B1* | 7/2015 | Kilian | B64C 25/68 |
| 9,789,950 B1 | 10/2017 | Most et al. | |
| 10,040,554 B1* | 8/2018 | Weinstein | G01S 17/06 |
| 10,364,026 B1 | 7/2019 | Hanlon et al. | |
| 10,384,772 B2 | 8/2019 | Yamada et al. | |
| 10,663,266 B2 | 5/2020 | Banga et al. | |
| 10,689,109 B2* | 6/2020 | Wypyszynski | F41H 11/04 |
| 10,926,875 B2 | 2/2021 | Klein | |
| 2009/0114761 A1 | 5/2009 | Sells, II | |
| 2009/0212157 A1 | 8/2009 | Arlton et al. | |
| 2010/0181424 A1 | 7/2010 | Goossen et al. | |
| 2012/0216697 A1 | 8/2012 | Jacobsen et al. | |
| 2014/0183300 A1 | 7/2014 | MacCulloch et al. | |
| 2015/0360797 A1 | 12/2015 | Melish et al. | |
| 2016/0023760 A1 | 1/2016 | Goodrich | |
| 2016/0117932 A1 | 4/2016 | Park et al. | |
| 2016/0250535 A1 | 9/2016 | Yatsko | |
| 2016/0293015 A1 | 10/2016 | Bragin | |
| 2016/0376029 A1 | 12/2016 | Sekiya | |
| 2017/0057635 A1 | 3/2017 | Strayer | |
| 2017/0059692 A1 | 3/2017 | Laufer et al. | |
| 2017/0144756 A1 | 5/2017 | Rastgaar Aagaah et al. | |
| 2017/0205820 A1 | 7/2017 | Liu | |
| 2017/0225784 A1 | 8/2017 | Hayes et al. | |
| 2017/0253348 A1* | 9/2017 | Ashdown | H04K 3/65 |
| 2017/0261292 A1 | 9/2017 | Armstrong et al. | |
| 2017/0261604 A1 | 9/2017 | Van Voorst | |
| 2017/0291704 A1 | 10/2017 | Alegria | |
| 2017/0355461 A1* | 12/2017 | Naito | G05D 1/12 |
| 2017/0356726 A1* | 12/2017 | Theiss | B64C 39/024 |
| 2017/0369169 A1 | 12/2017 | Lee et al. | |
| 2018/0162529 A1* | 6/2018 | Klein | B64D 1/02 |
| 2018/0162530 A1* | 6/2018 | Klein | G05D 1/0094 |
| 2018/0164080 A1 | 6/2018 | Chi-Hsueh | |
| 2018/0197420 A1 | 7/2018 | Banga | |
| 2018/0224262 A1 | 8/2018 | Klein | |
| 2018/0237161 A1 | 8/2018 | Minnick et al. | |
| 2018/0244401 A1* | 8/2018 | Kilian | B64C 39/024 |
| 2018/0257780 A1 | 9/2018 | Sassinsky | |
| 2018/0335779 A1* | 11/2018 | Fisher | B64C 39/024 |
| 2019/0025858 A1 | 1/2019 | Bar-Nahum et al. | |
| 2019/0063881 A1* | 2/2019 | Abramov | B64C 39/024 |
| 2019/0068953 A1* | 2/2019 | Choi | G03B 15/006 |
| 2019/0100315 A1* | 4/2019 | Theiss | B64D 7/00 |
| 2019/0112045 A1* | 4/2019 | Zhang | B64C 39/024 |
| 2019/0129427 A1* | 5/2019 | Sugaki | G05D 1/0094 |
| 2019/0176684 A1 | 6/2019 | Zych | |
| 2019/0176986 A1 | 6/2019 | Addonisio et al. | |
| 2019/0346241 A1* | 11/2019 | Metz | F41F 3/042 |
| 2020/0108923 A1 | 4/2020 | Smith et al. | |
| 2020/0108924 A1 | 4/2020 | Smith et al. | |
| 2020/0108925 A1 | 4/2020 | Smith et al. | |
| 2020/0108926 A1 | 4/2020 | Smith et al. | |
| 2021/0188435 A1 | 6/2021 | Smith et al. | |

FOREIGN PATENT DOCUMENTS

| | | |
|---|---|---|
| KR | 10-2015-0145786 | 12/2015 |
| KR | 10-2017-0079782 | 7/2017 |
| WO | WO 2018/016017 A1 | 1/2018 |
| WO | WO 2018/112281 A1 | 6/2018 |

OTHER PUBLICATIONS

International Search Report for International Application No. PCT/US2019/054541 dated Jan. 14, 2020, 18 pages.
International Search Report for International Application No. PCT/US2019/054537 dated Jul. 16, 2020, 22 pages.
International Search Report for International Application No. PCT/US2019/054545 dated Jul. 24, 2020, 24 pages.
International Search Report for International Application No. PCT/US2019/054547 dated Jul. 24, 2020, 23 pages.
Airspace Systems Inc.; "Airspace LV"; Vimeo [online] [video]; vimeo.com; (Apr. 5, 2017); 2 pages; [retrieved on Oct. 2, 2018]; Retrieved from <URL: https://vimeo.com/211704482?from=outro-embed >.
Airspace Systems, Inc.; "Airspace"; airspace.co; (2016); 4 pages; [retrieved on Oct. 2, 2018]; Retrieved from <URL: http://airspace.co/#technology >.
Atherton; "This Drone Fires Nets to Catch Other Drones"; Popular Science; (Apr. 5, 2016); [retrieved on Oct. 2, 2018]; Retrieved from <URL: https://www.popsci.com/drone-fires-nets-to-catch-other-drones >.
Dedrone; "Dedrone Videos"; dedrone.com; (2018); 3 pages; [retrieved on Oct. 2, 2018]; Retrieved from<URL: https://www.dedrone.com/products/videos >.
Fortem Technologies; "Fortem DroneHunter™ Demonstration"; YouTube [online] [video]; YouTube.com; (Sep. 24, 2017); 1 page; [retrieved on Oct. 2, 2018]; Retrieved from <URL: https://www.youtube.com/embed/BsFXLPFzK-4 >.
Groupe Assmann; "Drone Interception"; YouTube [online] [video]; YouTube.com; (Dec. 12, 2014); 2 pages; [retrieved on Oct. 2, 2018]; Retrieved from <URL: https://youtu.be/APWG3VEGbJw >.
Moseman; "This Drone Interceptor Captures Your Pathetic Puny Drone With a Net"; Popular Mechanics; (Feb. 11, 2015); 6 pages; [retrieved on Oct. 2, 2018]; Retrieved from <URL: http://www.popularmechanics.com/flight/drones/a14032/france-dispatches-a-net-carrying-bully-drone-to-catch/ >.
Openworks Engineering Ltd.; "SkyWall"; Openworks Engineering; [brochure]; (2017); 15 pages; <URL: https://openworksengineering.com/skywall >.
Starrs; "To Catch a Drone, Use a Net"; The Washington Post (WP Company LLC); (Jan. 15, 2016); 3 pages; [retrieved on Oct. 2, 2018]; Retrieved from <URL: https://www.washingtonpost.com/news/morning-mix/wp/2016/01/15/watch-a-drone-catcher-net-a-rogue-drone/?utm_term=.63257596ca17 >.

* cited by examiner

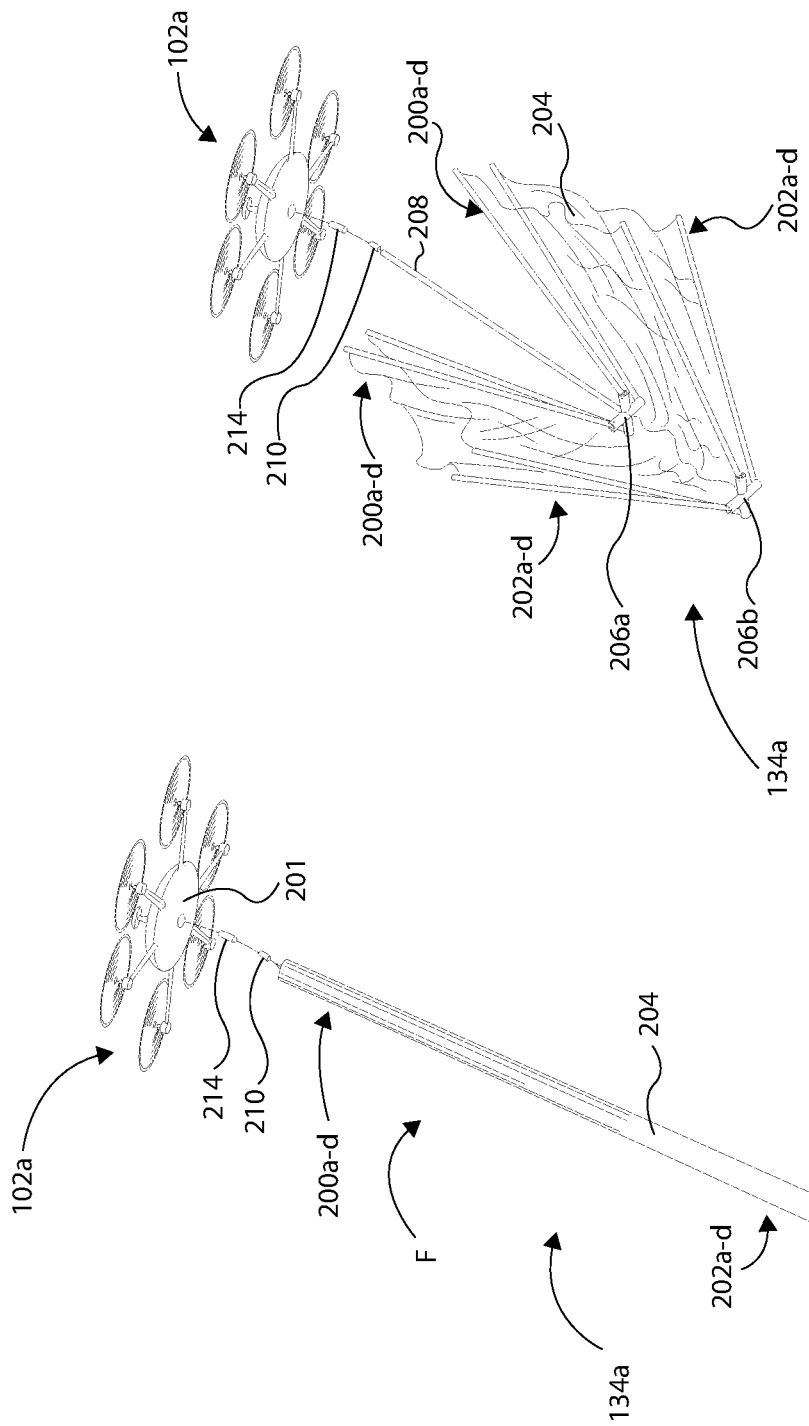

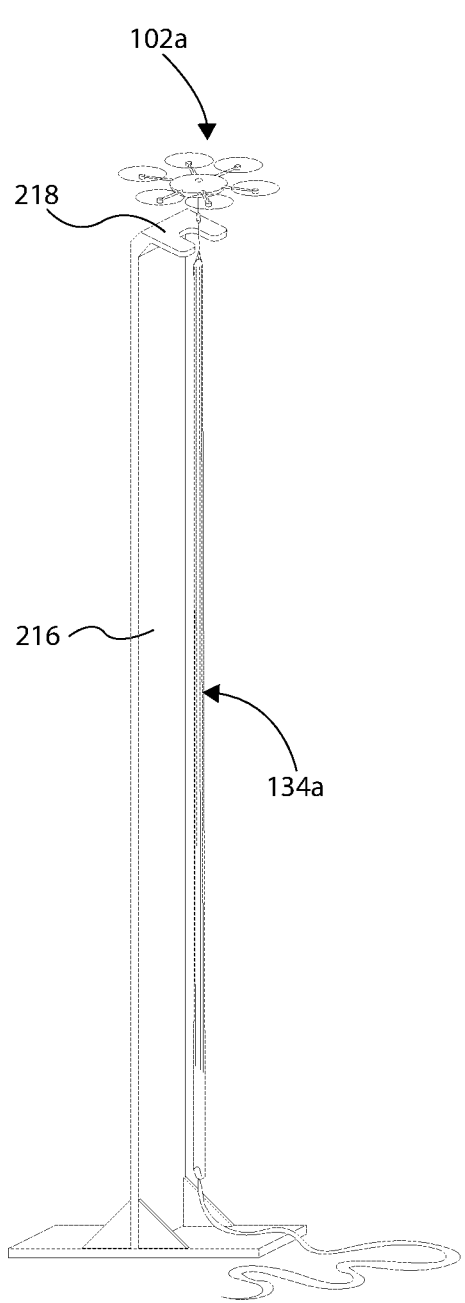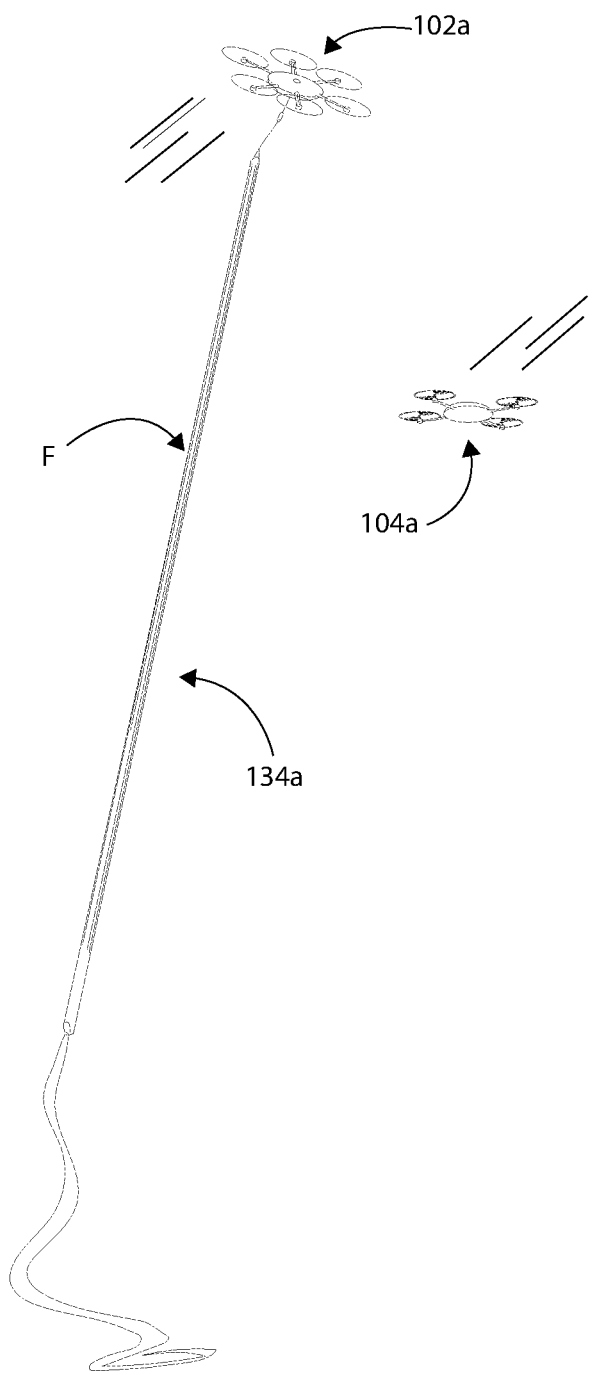
FIG. 5A
FIG. 5B

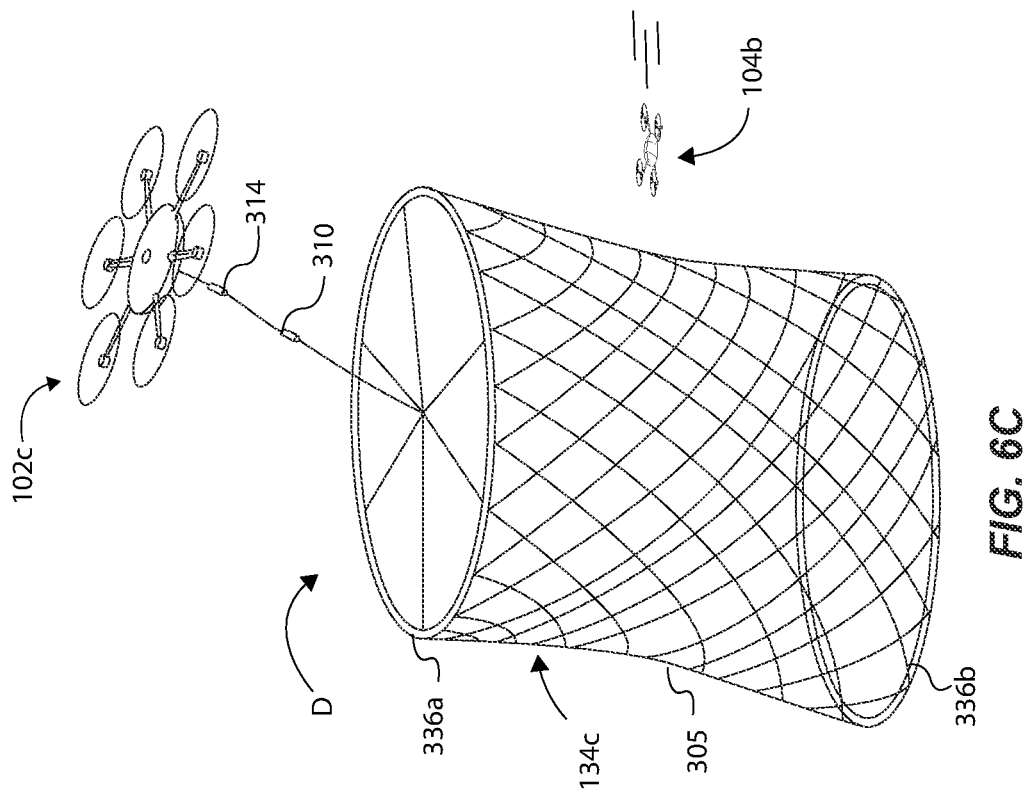
FIG. 6C
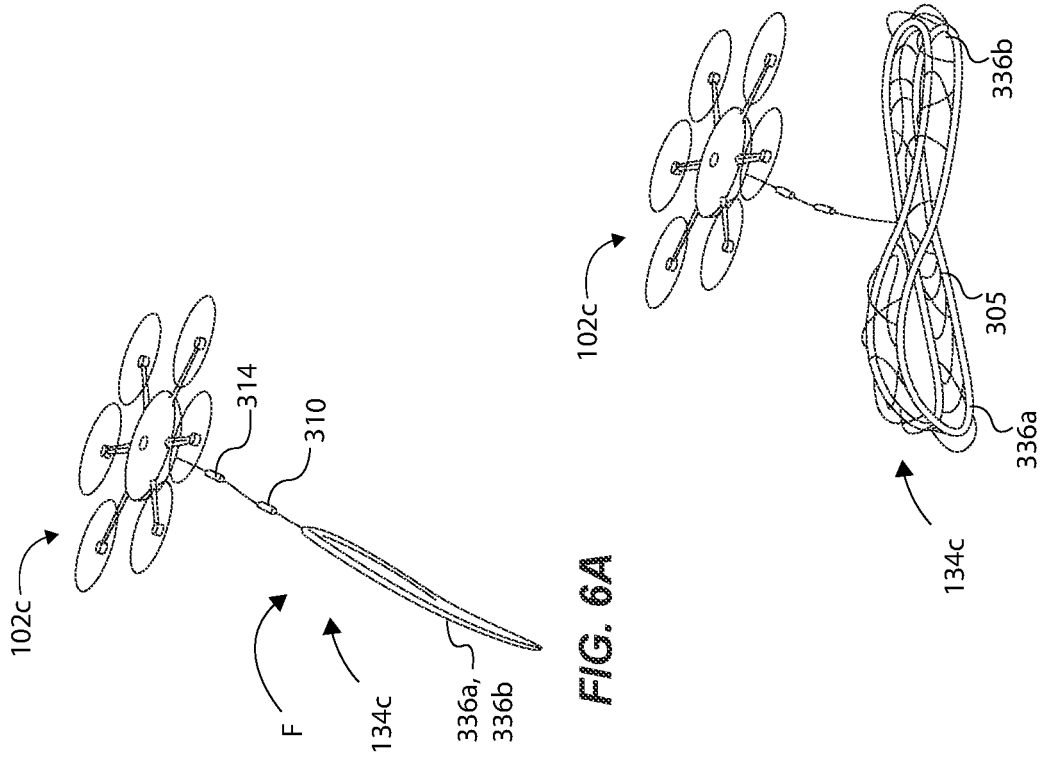
FIG. 6A
FIG. 6B

DEPLOYABLE AERIAL COUNTERMEASURES FOR NEUTRALIZING AND CAPTURING TARGET AERIAL VEHICLES

BACKGROUND

Unmanned aerial vehicles (UAVs), such as multi-rotor drones, fixed-wing drones, and tilt rotor drones, have become increasingly popular in the past decade. This popularity, coupled with their constantly improving performance capabilities, pose threats in terms of collisions with other aerial vehicles or structures, whether accidental or deliberate. More serious threats are also becoming more of a realization and possibility, such as terrorist attacks on high-value targets, such as government complexes, international airports, nuclear or other power plants, petrochemical facilities, water reservoirs, sporting events, and other highly-populated or critical infrastructure or locations. Factors that contribute to such threats are the high rate of speed of drones, their small signature, the possibility of simultaneous, coordinated attacks from a number of attacking drones, their ability to carry increasingly large payloads, and others. These factors are exacerbated by the fact that drones are relatively inexpensive, easy to acquire, highly portable, and highly maneuverable. Moreover, consumer drones are dramatically improving in terms of endurance, range, and payload transport capabilities (e.g., some consumer drones can carry up to 50 lbs., with other more expensive and advanced drones being able to carry up to 400 pounds), which is enough to carry significant amounts of explosives, projectiles, biological, and/or chemical weapons. In many cases, a drone operated for a deliberate attack can be launched and flown into a protected perimeter within just a few seconds, which leaves minimal time to detect and neutralize the attacking drone.

With all these considerations in mind, one or more inexpensive adversarial drones can be autonomously or manually flown into a protected area while potentially causing a large amount of damage and/or harm, all at a very low cost and effort by a programmer/operator. Counteracting such threats with existing technologies can be very costly and complex, particularly when trying to protect a relatively large airspace associated with hundreds of acres or square kilometers of a property.

BRIEF SUMMARY OF THE INVENTION

In one example, the present disclosure sets forth a counter-attack unmanned aerial vehicle ("counter-attack UAV") for aerial neutralization of a target aerial vehicle. The counter-attack UAV can comprise a flight body and a flight control system that controls flight of the counter-attack UAV to intercept a detected target aerial vehicle. The counter-attack UAV can comprise an aerial vehicle capture countermeasure, carried by the flight body, and that is operable to capture the detected target aerial vehicle, thereby neutralizing the target aerial vehicle.

In one example, the counter-attack UAV comprises at least one sensor configured to detect a position of the target aerial vehicle. The flight control system can comprise a flight controller operable to control autonomous flight of the counter-attack UAV based on a detected position of the target aerial vehicle.

In one example, the counter-attack UAV comprises a wireless communication device supported by the flight body and communicatively coupled to an external aerial vehicle detection system. The communication device can be configured to receive command data, which can include location data, from the external aerial vehicle detection system to intercept the target aerial vehicle, and the command data can be associated with the target aerial vehicle as detected by the external aerial vehicle detection system.

In one example, the present disclosure sets forth a system for detecting and neutralizing a target aerial vehicle. The system can comprise a counter-attack UAV comprising: a flight body; a flight control system that controls flight of the counter-attack UAV; and an aerial vehicle capture countermeasure carried by the flight body. The system can comprise an aerial vehicle detection system comprising at least one detection sensor operable to detect a target aerial vehicle while the target aerial vehicle is in flight. The aerial vehicle detection system can be operable to provide command data, which can include location data, to the counter-attack UAV to facilitate interception of the target aerial vehicle by the counter-attack UAV. In response to interception of the target aerial vehicle, the counter-attack UAV is operable to capture the detected target aerial vehicle with the aerial vehicle capture countermeasure, thereby neutralizing the target aerial vehicle.

In one example, the aerial vehicle detection system comprises an on-board aerial vehicle detection system comprising at least one sensor configured to detect a position of the target aerial vehicle. The flight control system can comprise a flight controller operable to control autonomous flight of the counter-attack UAV based on the detected position of the target aerial vehicle.

In one example, the aerial vehicle detection system can comprise an external aerial vehicle detection system comprising at least one detection sensor operable to detect the target aerial vehicle, and to provide command data to the counter-attack UAVs to facilitate interception of the target aerial vehicle by the counter-attack UAVs.

In one example, the external aerial vehicle detection system is associated with a ground-based structure to monitor an airspace, and the at least one detection sensor comprises a plurality of detection sensors configured to detect at least one target aerial vehicle.

In one example, the system can comprise a plurality of counter-attack UAVs and an aerial vehicle capture countermeasure coupling together the plurality of counter-attack UAVs. The plurality of counter-attack UAVs can be operable in a coordinated manner to capture the target aerial vehicle with the aerial vehicle capture countermeasure, thereby neutralizing the target aerial vehicle.

In one example, the present disclosure sets for a method for aerial neutralization of a target aerial vehicle. The method can comprise: detecting a target aerial vehicle while in flight; operating a counter-attack UAV to intercept the target aerial vehicle; and capturing the target aerial vehicle with an aerial vehicle capture countermeasure carried by a flight body of the counter-attack UAV, thereby neutralizing the target aerial vehicle.

In one example, wherein detecting the target aerial vehicle further comprises tracking a dynamic flight position with an aerial vehicle detection system.

In one example, the method can comprise communicating position data between a plurality of counter-attack UAVs to facilitate coordinated neutralization of the target aerial vehicle, and deploying the aerial vehicle capture countermeasure to a deployed position by coordinating flight of the plurality of counter-attack UAVs.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein:

FIG. 4A illustrates one of the counter-attack UAVs of FIG. 1, carrying or supporting an aerial vehicle capture countermeasure in a stowed or folded position in accordance with one example of the present disclosure.

FIG. 4B illustrates the counter-attack UAV of FIG. 4A, showing the aerial vehicle capture countermeasure transitioning from the folded position to a deployed position.

FIG. 5A illustrates the counter-attack UAV of FIG. 4A, supported by a pedestal while in a grounded state in accordance with an example of the present disclosure.

FIG. 5B illustrates the counter-attack UAV of FIG. 4A deployed from the pedestal to intercept and neutralize a target aerial vehicle.

FIG. 6A illustrates another one of the counter-attack UAVs of FIG. 1, carrying or supporting an aerial vehicle capture countermeasure in a stowed or folded position, in accordance with another example of the present disclosure.

FIG. 6B illustrates the counter-attack UAV of FIG. 6A, showing the aerial vehicle capture countermeasure transitioning from the folded position to a deployed position.

FIG. 6C illustrates the counter-attack UAV of FIG. 6A, showing the aerial vehicle capture countermeasure in the deployed position, and ready to capture a target aerial vehicle.

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

To further describe the present technology, examples are now provided with reference to the figures.

Figure 1:
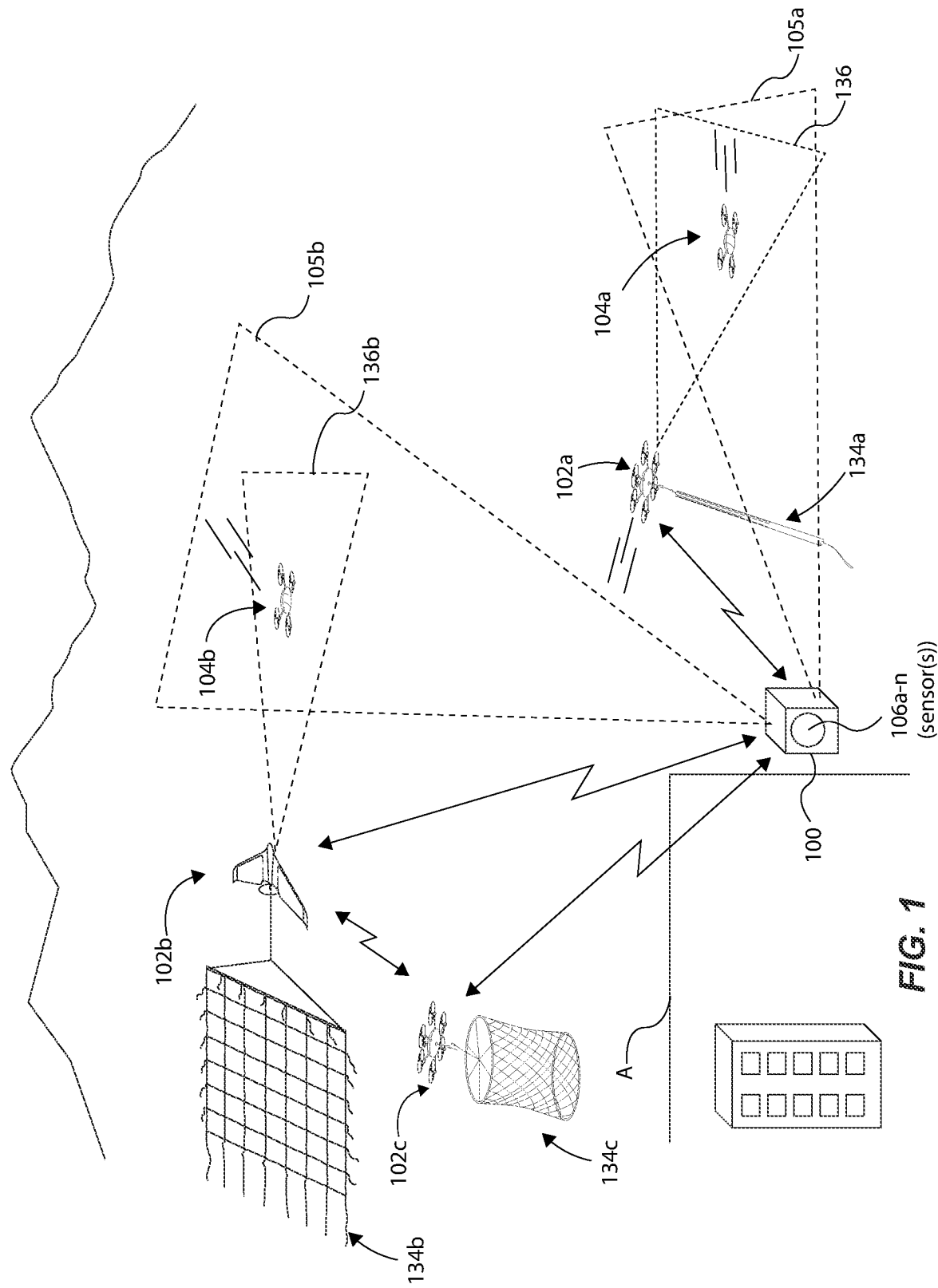
FIG. 1 is an illustration that graphically and schematically shows a system for detecting and neutralizing target aerial vehicle(s) with a counter-attack UAV in accordance with an example of the present disclosure.
Figure 2:
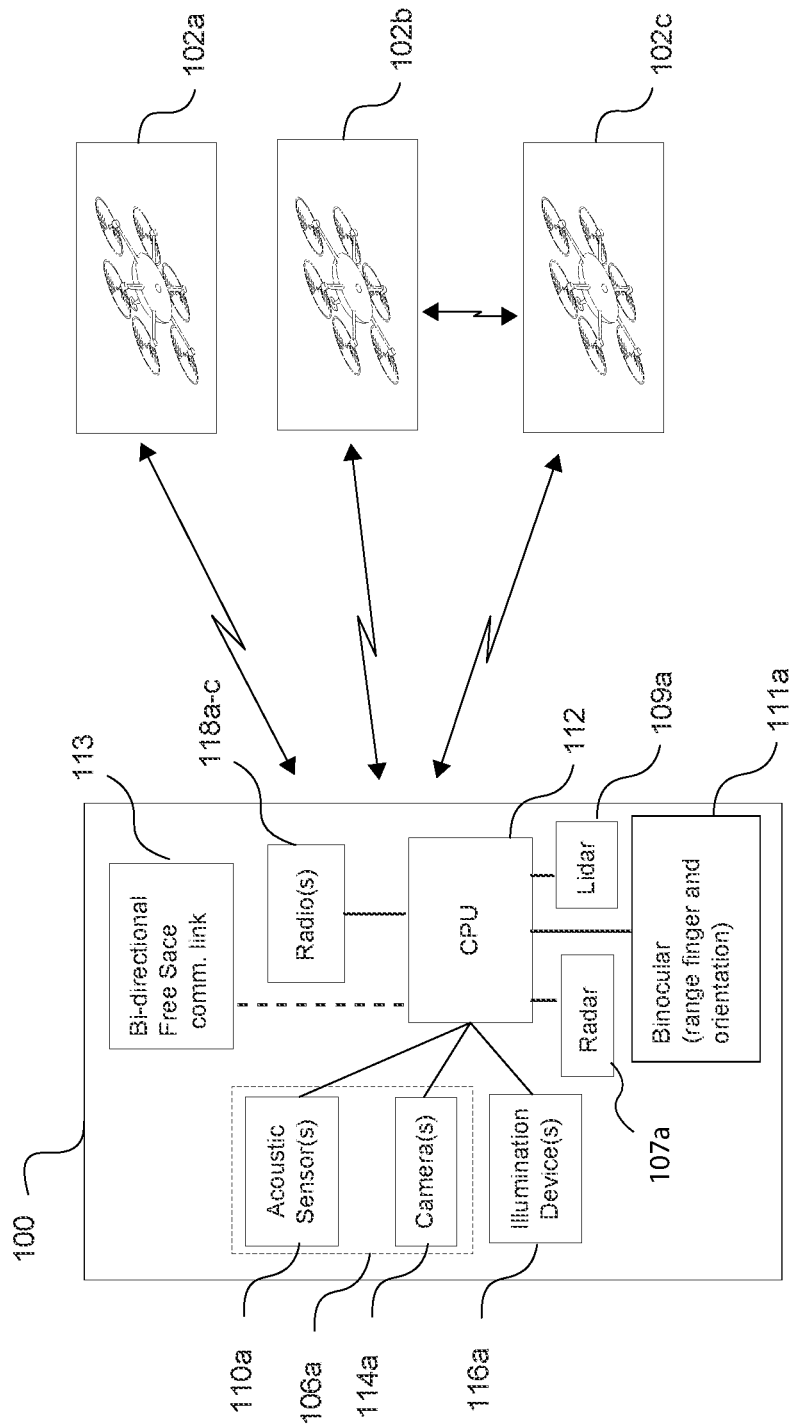
FIG. 2 is a block diagram that illustrates possible detection and communication features of the system of FIG. 1 in accordance with an example of the present disclosure.
Figure 3:
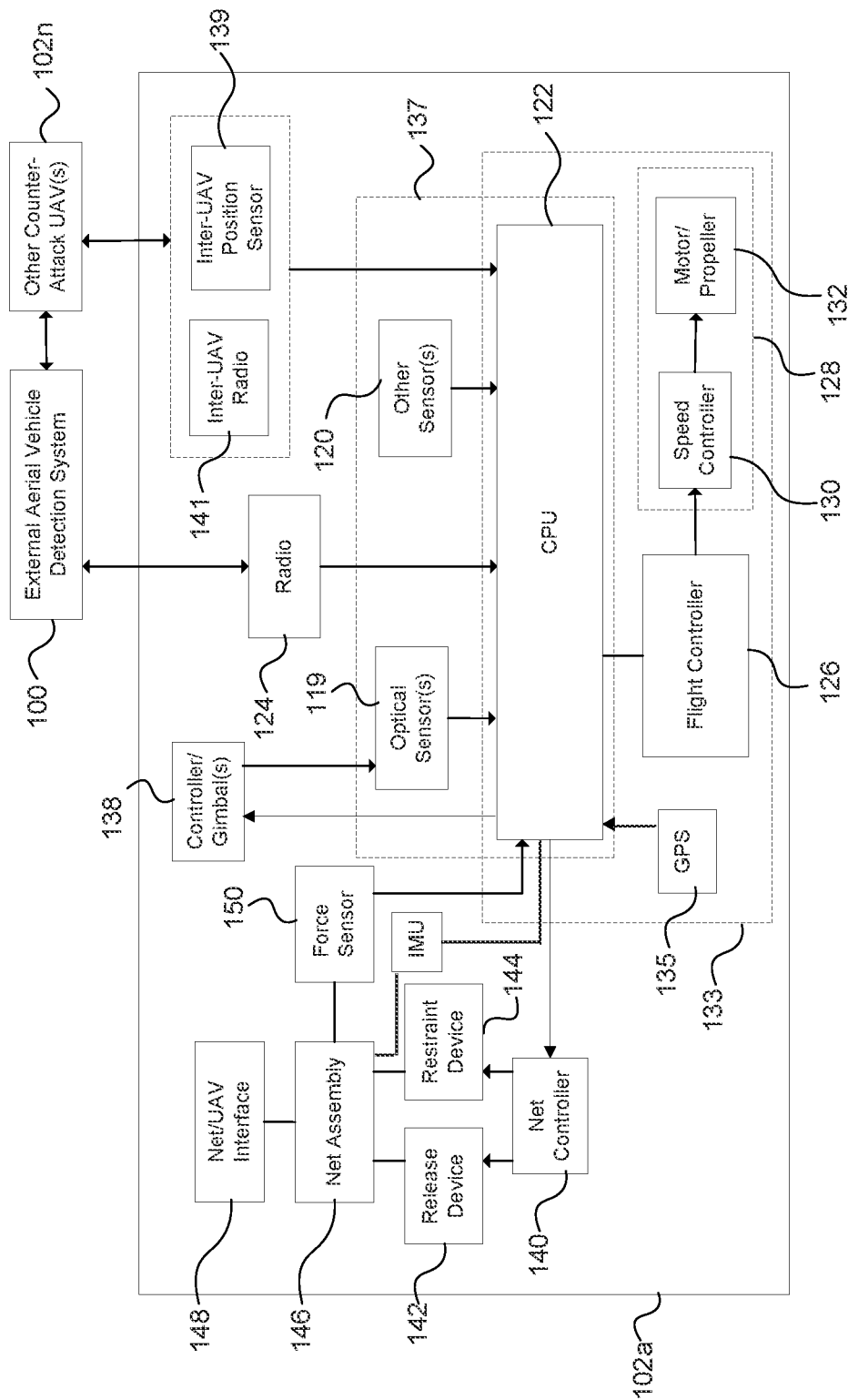
FIG. 3 is a block diagram that illustrates possible detection and operation features of any one of the counter-attack UAVs of FIG. 1 in accordance with an example of the present disclosure.

FIG. 1 schematically and graphically illustrates a system and method for protecting an airspace area A with an external aerial vehicle detection system 100 and one or more counter-attack UAV(s), such as example counter-attack UAVs 102a-c. The external aerial vehicle detection system 100 can be configured to communicate with the counter-attack UAV(s) 102a-c for the purpose of neutralizing one or more target aerial vehicle(s) (e.g., see target aerial vehicles 104a and 104b) that may be encroaching or approaching the airspace area A, and that are determined to be a threat to the airspace area A. FIG. 2 is a block diagram that illustrates the components of the external aerial vehicle detection system 100 and its ability to perform detecting and real-time tracking of the target aerial vehicle(s) 104a and/or 104b, and to communicate command data to the counter-attack UAV(s) 102a-c. The command data can include any data relevant to facilitate capture of the target UAV, including, but not limited to, data pertaining to the location of the target UAV. And, FIG. 3 is a block diagram that illustrates a control system of an individual counter-attack UAV (e.g., any one of 102a-c) for neutralizing the target aerial vehicle(s) 104a and/or 104b, and how the control system is operable with the external aerial vehicle detection system 100 and other counter attack UAVs 102.

As an overview, and in one example, the system of FIG. 1 can comprise the external aerial vehicle detection system 100 configured to detect incoming target aerial vehicles 104a and 104b that may be a threat to infrastructure and/or assets within the airspace area A (e.g., buildings, commercial airplanes, utilities, personnel). The external aerial vehicle detection system 100 can be configured to obtain and communicate information about the detected target aerial vehicles 104a and 104b, such as their tracked position(s) periodically over time or in real-time, their altitude, their trajectory, their velocities, and any other sensed or acquired information pertaining to the target aerial vehicles 104a and 104b. Once obtained, this information can be communicated to the counter-attack UAV(s) 102a-c, so that the counter-attack UAV(s) 102a-c can intercept and neutralize the respective target aerial vehicle(s) 104a and 104b, as further detailed below. The target aerial vehicles 104a and 104b can be any type of UAV, for example, but not limited to, unmanned single or multi-rotor UAVs or fixed-wing UAVs (or tilt rotor UAVs), and others, that can be operated autonomously or manually. Alternatively, the target aerial vehicles 104a and 104b can be manned vehicles, such as a manned helicopter, manned propeller airplane, or other manned aerial vehicles. As mentioned, target aerial vehicles 104a and 104b (e.g., multi-rotor UAVs) can be significant threats because they can ascend/descend vertically up to several kilometers in airspace, can hover for many minutes, are extremely agile, fast, and maneuverable around obstacles, have small visual/IR/radar signatures, and can transport substantial payloads. Therefore, quickly detecting and tracking their positions and velocities within a relatively short timeframe (e.g., a few seconds) is critical to effectively prevent breach of the airspace area A, and more importantly to protect assets associated with the monitored airspace area A.

To "intercept" can mean that a counter-attack UAV, such as counter-attack UAV 102a (and/or 102b, 102c) is flown into a position relative to a target aerial vehicle (for example, target aerial vehicle 104a) that permits the counter-attack UAV 102a to perform a neutralizing function with respect to the target aerial vehicle 104a. This can include, but is not limited to, flying the counter-attack UAV 102a into a projected flight path of the target aerial vehicle 104a, or along a flightpath offset from, but proximate the target aerial vehicle 104a, or to a position proximate the target aerial vehicle 104a, or along a flightpath behind the target aerial vehicle 104a, or along any other flight path or to any position where the counter-attack UAV 102a is in close proximity to the target aerial vehicle 104a.

The external aerial vehicle detection system 100 can be supported by or associated with a ground-based structure, a vehicle (e.g., land, sea, or air), a movable platform, or other platform that can support a number of components discussed herein as associated with the external aerial vehicle detection system 100. The external aerial vehicle detection system 100 can comprise a number of sensors or platforms spaced apart from each other around an area or about different structures, and that can each be communicatively coupled to each other and/or a central computer system for controlling gimbals, for pointing positions, for processing data associated with target aerial vehicle(s), and for communicating command data to one or more counter-attack UAVs. Note that a plurality of aerial vehicle detection systems (e.g., 100) can be incorporated around an area to protect a larger airspace, and which can each have a computer system communicatively coupled to the computer systems of the other aerial vehicle detection systems to cooperatively monitor and protect a given airspace.

As more particularly shown in FIG. 2, the external aerial vehicle detection system 100 can comprise at least one detection sensor 106a (where, although not shown, up to n (any) number of detection sensors are contemplated, as will be appreciated by those skilled in the art) operable to collect and generate data associated with the target aerial vehicles(s) 104a and 104b (e.g., velocity, geolocation, altitude, trajectory or flight path, and others). For example, the detection sensor(s) 106a can comprise one or more acoustic sensor(s), such as acoustic sensor 108a, and one or more camera(s), such as camera 110a that are operable to collect and generate data associated with the target aerial vehicle(s) 104a and 104b. The detection sensor(s) 106a can comprise other target acquisition assets, such as radar device(s) 107a, LIDAR device(s) 109a, and/or binocular(s) 111a, each coupled to a CPU 112 and having the capability to measure azimuth elevation/tilt angle of a target aerial vehicle. The detection sensor(s) 106a can further comprise other sensors, such as electromagnetic signature sensors used to detect a target aerial vehicle prior to taking-off, and/or cameras operating over a different portion of the electromagnetic spectrum from LWIR to SWIR to visible. Other possible sensors include narrow band light emitters with detectors (e.g., cameras) that have their detection band closely matched to those of the light emitters, and/or other sensors such as narrow band light emitters (e.g., UV sources) that may make portion the target fluoresce in a different portion of the electromagnetic spectrum facilitating its detection. Note that the detection sensor(s) 106a may be able to detect multiple target aerial vehicles at the same time, wherein the CPU 112 (or multiple CPUs) can be configured to determine which sensor(s) is/are most credible or reliable for target aerial vehicle(s), and then configured to assign one or more of such sensor(s) to continue to track and monitor the target aerial vehicle(s) while un-assigning other sensor(s) from tracking particular target aerial vehicle(s). This concept is further discussed below regarding the "credibility hierarchy".

In some examples, the acoustic sensor(s) 110a can comprise one or more microphones that can detect and track target aerial vehicle(s) 104a and 104b at a large distance (e.g., up to 500 meters, or more). A database of UAV signatures can be obtained or built and accessed by a CPU 112 of the aerial vehicle detection system 110 to determine the existence and type of the detected target aerial vehicle(s) 104a and 104b. In this manner, the CPU 112, utilizing a processor, can eliminate or ignore the signatures of any (friendly) counter-attack UAV(s) 102a-c that may be in flight while detecting the signatures of target aerial vehicle(s) 104a and 104b (assuming the "friendly" and "enemy" UAVs are different types of UAVs, or assuming the CPU 112 is programmed to differentiate between the two, such as based on known positions of counter-attack UAVs).

In some examples, one or more sensor(s) or camera(s) 114a (e.g., see sensor 114a, although n number of sensors are contemplated) (e.g., IR, optical, CCD, CMOS) can be incorporated as one or more of the detection sensors (e.g., see detection sensor 106a, although n number of detection sensors are contemplated) of the external aerial vehicle detection system 100. For instance, infrared (IR) camera(s) can be implemented into the system and directed toward a particular airspace for viewing possible incoming target aerial vehicles. IR cameras are useful in this system because they can assist to overcome environmental problems experienced by other sensors (e.g., optical cameras), because IR cameras can operate in the dark or in foggy, dusty, or hazy conditions. IR cameras utilized in this system have the additional advantage that the IR signal from a target aerial vehicle (e.g., a UAV) is very different from that of birds in flight. IR cameras based on the shortwave infrared (SWIR) spectrum can interact with objects in a similar manner as visible wavelengths, as it is reflective, bouncing-off objects. As a result, SWIR light has shadows and contrast in its imagery. Images from a SWIR camera are comparable to visible images in resolution and detail. An atmospheric phenomenon called night sky radiance or night glow emits five to seven times more illumination than starlight, nearly all of it in the SWIR wavelengths. Because of this, SWIR cameras can see objects with great clarity on moonless nights. Such SWIR camera(s) can be incorporated into the present external aerial vehicle detection system 100 (and/or into the counter-attack UAV(s)). Longwave infrared (LWIR) cameras are more optimal for outdoor use because they are less affected by radiation from the Sun than with SWIR cameras. As such, LWIR camera(s) can be incorporated into the external aerial vehicle detection system 100 to benefit from the advantages of outdoor use to detect and track target aerial vehicle(s). Other camera(s), such as optical cameras (e.g., HD, 4K), can also be incorporated as detection sensor(s) 106a of the external aerial vehicle detection system 100 to assist with detection and tracking the position of target aerial vehicle(s) 104a and 104b.

In some examples, one or more telephoto lenses can be operable and incorporated with one or more of the SWIR and LWIR camera(s), and/or optical camera(s), and can be mounted on high-resolution motorized gimbals (e.g., 2-axis gimbals) associated with the external aerial vehicle detection system 100 to assist with detecting and tracking the position(s) of target aerial vehicle(s) 104*a* and 104*b*, including the angular position and/or azimuth elevation, in some cases depending on the type of sensor employed. Two or more detection sensors described herein can be used to compute range of a target aerial vehicle. Moreover, a particular camera (e.g., IR, optical) can be used in conjunction with an on-board (or remotely supported) laser range finder to determine the position of the target aerial vehicle in three-dimensional space (e.g., distance, azimuth angle, and elevation angle). Such telephoto lenses and gimbals can each be operated to establish the pointing position (and to dynamically modify the pointing position) of the associated camera, and therefore adjust a field-of-view (FOV) 105*a* (FIG. 1), for instance, of a particular camera. These telephoto lenses and gimbals can be operated manually or autonomously (discussed below) to continuously track a dynamic flight position or path of a particular target aerial vehicle. In one example, a 360-degree camera device (having IR or optical camera(s)) could also be integrated with the external aerial vehicle detection system 100 to monitor an entire 360-degree air space, which may or may not require a gimbal for operation to monitor such airspace.

Computer vision algorithms stored and processed by the CPU 112 of the external aerial vehicle detection system 100 can be implemented for automatic detection and tracking of the target aerial vehicle(s) 104*a* and 104*b*. Such computer vision algorithms can "pull" a moving object out of a static background and classify it by shape (i.e., feature detection). Other mechanisms for classification of target aerial vehicle(s) 104*a* and 104*b* include using neural networks, which are computer algorithms designed to mimic the workings of the human brain, that are trained to recognize known/stored images of profiles that may be similar to the particular detected target aerial vehicle(s) 104*a* and 104*b*. Those skilled in the art will recognize that various known algorithms can be implemented to achieve this functionality, including "convolutional neural network" (CNN) combined with fast detection, such as provided by the You Only Look Once (YOLO) detection architecture known in the industry. Once the target aerial vehicle(s) are detected by the computer vision system (e.g., CNN, YOLO), the gimbal orientation supporting the camera can be used to determine azimuthal and elevation of the target aerial vehicle. Information from multiple computer vision systems may be combined to calculate range in addition to azimuthal and elevation angle. The target classification and position information collected using the computer vision system can further be combined/fused with information collected from other sensor(s) (e.g., 106*a*) to increase the likelihood of detection, and/or accuracy of classification of the target aerial vehicle, and/or tracking of the position of the target aerial vehicle.

In some examples, Phase-Based Video Motion processing technology can be incorporated with the external aerial vehicle detection system 100 (e.g., software processed by the CPU 112). Phase-Based Video Motion processing technology amplifies very small motions that otherwise could not be detected. This technology is further described in U.S. Patent Pub. No. US20170000356 filed Jul. 1, 2015, which is incorporated by reference herein. Thus, small vibration motions inherent to target aerial vehicles (e.g., UAVs) can be detected, which can overcome the issues with using only cameras to detect and track target aerial vehicles. For instance, as similarly discussed in U.S. Patent Pub. No. US20170000356, a method executed by a processor (e.g., CPU 112) receives a video as input (e.g., video of a target aerial vehicle) and exaggerates subtle changes and micromotions. To amplify motion, the method does not perform feature tracking or optical flow computation, but merely magnifies temporal changes using spatio-temporal processing. This Eulerian based method, which temporally processes pixels in a fixed spatial region, reveals informative signals and amplifies small motions in real-world videos. The Eulerian-based method begins by examining pixel values of two or more images. The method then determines (with the processor) the temporal variations of the examined pixel values. The method is designed to amplify only small temporal variations. While the method can be applied to large temporal variations, the advantage in the method is provided for small temporal variations, such as when a target aerial vehicle is detected at long ranges. Therefore, the method can be optimized when the input video has small temporal variations between the images of a particular target aerial vehicle while in flight. The method can then apply signal processing to the pixel values. For example, signal processing can amplify the determined temporal variations, even when the temporal variations are small, such as vibrations of a target aerial vehicle as captured in successive images by an optical sensor of an external vehicle detection system of the present disclosure.

Once the target aerial vehicle(s) 104*a* and 104*b* have been identified in successive frames of video (e.g., using IR and/or 4K optical cameras, and/or other sensors such as Radar), autonomously tracking a dynamic flight position or path of the target aerial vehicle(s) 104*a* and 104*b* and fusing position information provided by different sensing methodology (e.g., camera and Radar) can be performed by utilizing a Kalman filter, extended Kalman filter, particle filters, or another variation of a Bayesian filter. These filters work by taking an estimate of the velocity, position, and orientation of the particular target aerial vehicle 104*a*, for instance, and then predicting where the target aerial vehicle 104*a* will be in the next frame of video. Then, the position of the target aerial vehicle 104*a* in the next video frame is compared with the predicted position, and the estimates for the velocity, position, and orientation are updated. During such tracking with one of the cameras 114*a*, a feedback control loop can autonomously and continually adjust the gimbal (supporting the particular camera) to keep the target aerial vehicle 104*a* centered about the FOV 105*a* of the camera of the external aerial vehicle detection system 100. This facilitates or maintains continuous tracking of a dynamic flight position of a particular target aerial vehicle. Common algorithms include centroid tracking, edge detection, feature-based algorithms, and area correlation tracking. Using this system of cameras and filters, the external aerial vehicle detection system 100 can detect and track, in real-time, a flight position or path of a particular target aerial vehicle.

Indeed, a number of detection sensors 106*a* can be positioned about a structure or platform of the external aerial vehicle detection system 100 in a manner that the detection sensors 106*a* can cooperatively and collectively monitor a perimeter of up to 360 degrees associated with an airspace around the position of the external aerial vehicle detection system 100 to protect an area (e.g., a 500+m radius of coverage of an airspace). Alternatively, the detection sensors 106*a* can be mounted and configured to point toward a particular area of interest less than 360 degrees of coverage, such as through a canyon, or other particular egress of importance relative to the protected area A.

In some examples, the external aerial vehicle detection system 100 can comprise at least one illumination device (see illumination device 116a), such as a laser or high-powered LED, operable to illuminate the detected target aerial vehicle 104a (while continuously tracking the target aerial vehicle 104a, as detailed above). A particular illumination device 116a can be mounted on a gimbal device (e.g., 3-axis) that is operable to modify a pointing position or direction of the illumination device to continuously direct the illumination device toward the target aerial vehicle 104a for constant illumination. In this manner, a controller (operatively coupled to the CPU 112) can be operated to control said pointing position based on the tracked position or flight path of the target aerial vehicle 104a. As will be discussed below, the counter-attack UAVs 102a-c can have a band pass filter (on a camera) to detect only the narrow frequency band of light illuminated onto the target aerial vehicle 104a by the illumination device 116a of the external aerial vehicle detection system 100.

In another example of a detection sensor of the external aerial vehicle detection system (100), a telescope or a pair of human use binoculars equipped with azimuthal and elevation angle sensors may be used to locate a potential target aerial vehicle and transmit partial position information to the counter-attack UAV(s) (and/or to a CPU of the external aerial vehicle detection system). In another example, the telescope or binocular based detection system can be equipped with a range sensor, such as a laser range finder, and the information provided by this range sensor can be combined with that provided by the azimuthal and elevation angle sensors, thereby allowing the position of the target UAV to be tracked in 3D.

Once the target aerial vehicle 104a (for instance) is detected as entering a monitored airspace (e.g., within a 500 m radius of the external aerial vehicle detection system 100), the external aerial vehicle detection system 100 can transmit command data to the counter-attack UAV 102a for purposes of neutralizing the target aerial vehicle 104a with the aerial vehicle capture countermeasure 134a. Prior to receiving such command data, the counter-attack UAV(s) 102a-c may be in a grounded position at virtually any position(s) around the area A, as long as they are within a range of communication with the external aerial vehicle detection system 100. The command data can be generated by the CPU 112 and transmitted via radios 118a-c to the counter-attack UAV(s) 102a-c. Optionally, a bi-directional free space communication link 113 can be utilized in replacement of (or to supplement) radios 118a-c. The command data can include location data, and can be associated with the detected position(s) of the target aerial vehicle(s) 104a and 104b, and the command data can include data pertaining to a flight path, altitude, longitude, latitude, GPS coordinates (degrees, minutes, seconds), and/or other data associated with a geo-location and/or flight path of a particular target aerial vehicle. The command data can also include intercept data, such as information or instructions that command one or more counter-attack UAV(s) 102a-c to fly at a certain velocity and direction to intercept the detected target aerial vehicle.

The command data transmitted to the counter-attack UAV by the external aerial vehicle detection system 100 can also include aerial vehicle capture countermeasure deployment command data, such as information or instructions that instruct or command the counter-attack UAV(s) 102a-c to deploy a particular aerial vehicle capture countermeasure at a particular location and time, for instance. The command data can further include target aerial vehicle detection data, such as position data or information (discussed above), and even information other than position information, such as identification information about the type of UAV of the target aerial vehicle(s) detected by the detection sensor(s) 106a. Such information can aid the external aerial vehicle detection system 100 and/or the counter-attack UAV(s) 102a-c to determine the size, type (e.g., fixed or rotary wing), on-board features, and/or performance capabilities of a particular target aerial vehicle, for instance, which can affect the type of countermeasure to be deployed to neutralize the target aerial vehicle (as will be discussed and appreciated from the below discussion).

The command data can also include counter-attack UAV control data, which can include instructions (from the external aerial vehicle detection system 100) for controlling some or all aspects of the counter-attack UAVs 102a-c. In this manner, the counter-attack UAVs 102a-c can be "dummy" drones that have disabled or overridden internal flight controls, so that the external aerial vehicle detection system 100 can control flight, deployment, sensor pointing, etc. Therefore, the external aerial vehicle detection system 100 can detect and monitor the position or flight path of the target aerial vehicle 104b, for instance, with one detection sensor and processing unit, while controlling flight and countermeasure (e.g., net) deployment of the counter-attack UAVs 102b and 102c.

Using at least some of such command data, the counter-attack UAV(s) 102a-c can be guided or directed to be flown toward the position(s) (or predicted position), or within close proximity, of the target aerial vehicle(s) 104a and 104b for interception and neutralization purposes. This system discussed regarding FIGS. 1 and 2 is particularly advantageous in cases where the target aerial vehicle(s) 104a and 104b may be several kilometers away from the airspace area A, and even several kilometers in altitude. This is because it may be difficult for an individual counter-attack UAV to know where to "look" (and which direction to fly) in a plausibly large amount of airspace and at possible long ranges. This is because many on-board cameras of a counter-attack UAV can only detect, identify, and classify targets at larger ranges (e.g., greater than 100 m), if the FOV is significantly reduced (e.g., 10 degrees or less).

As discussed above, the external aerial vehicle detection system 100 can operate the plurality of detection sensors (e.g., two or more of detection sensors 106a) to generate position data associated with a target aerial vehicle. The CPU 112 can then operate to eliminate position data associated with one or more of the detection sensors based on a credibility hierarchy associated with the plurality of detection sensors. Such credibility hierarchy can be based on environmental conditions. For instance, when operating during daytime and with no clouds, the credibility hierarchy could include position data derived from the following list of prioritized detection sensors: (1) an optical camera, (2) binoculars, (3) IR camera(s), (4) a radar device, (5) a LIDAR device, (6) an acoustic sensor, (7) an illumination device, and (8) other sensors. More specifically, once the CPU 112 has determined or knows of such environmental conditions, the CPU 112 can eliminate position data associated with sensors 3 through 7 (and/or un-assign such sensors from operating), while using position data generated from (1) the optical camera and (2) the binoculars (e.g., assigned detection sensors). Ideally, position data generated from the optical camera(s) would be the most credible during daytime in daylight without clouds, birds, etc. However, if signals generated from (2) the binoculars are more credible for any particular reason (e.g., the binoculars have less intermittent signal loss than the optical camera), then the CPU 112 can eliminate the position data generated from the optical camera, and use the position data generated from the binoculars, and then communicate the position data to one or more counter-attack UAVs. Such processing of eliminating certain position data can occur many times per minute, so that the best tracking information is generated and processed by the external vehicle detection system 100 for transmitting to the counter-attack UAVs, thereby improving or increasing the chances of intercepting and capturing the detected target aerial vehicle(s).

In another example of credibility hierarchy, assume the operating conditions are at night and with cloud cover, such that very little light is emitted to an area to be monitored by the external vehicle detection system 100. Here, the credibility hierarchy may be as follows: (1) IR camera(s), (2) an acoustic sensor, (3) a radar device, (4) a LIDAR device, (5) an illumination device, (6) other sensors, (7) optical camera, and (8) binoculars. This is because at night, IR camera(s) may generate the most credible position data, as discussed above. Thus, the CPU 112 can eliminate position data generated from detection sensors 4 through 8, and then analyze the signals generated from detection sensors 1 through 3 to determine the most credible position data generated. For instance, if the acoustic sensor is getting interference from other sounds, and if the radar device is affected by weather patter, then the CPU may only use position data from the IR camera(s) as the most credible position data (and only data) for transmitting to the counter-attack UAV(s) to increase the chances of intercepting and capturing the detected target aerial vehicle(s).

It should be appreciated by those skilled in the art that the CPU 112 can include a tangible and non-transitory computer readable medium comprising one or more computer software modules configured to direct one or more processors to perform the method steps and operations described herein.

As illustrated in FIG. 3, a particular counter-attack UAV 102a (for instance) can comprise one or more optical sensors (e.g., see optical sensor 119), and/or other detection sensors 120. The optical sensors 119 and the other sensors 120 can be operatively coupled to a CPU 122 for processing data generated by the optical sensors 119 and the other sensors 120 associated with position(s) of the target aerial vehicle(s) 104a and 104b. The other sensors 120 can comprise one or more of the following: (a) a temperature sensor; (b) a barometer/altimeter (c) an inertial measurement unit (IMU) (gyro-accelerometer); (d) a compass (magnetometer); (e) ultrasonic and optical flow sensors; (f) an optical range finder (e.g., LIDAR by Leddartch, LIDAR by Velodyne, or LIDAR by Quanergy); (g) RTK-GPS and UWB tags; (h) stereo cameras (optical guidance system); (i) high resolution camera(s); (j) low resolution camera(s); (k) LWIR camera(s); and (l) gimbal position sensors, as well as any others apparent to those skilled in the art. Sensors (a-e), (g), (i), and (j) can also be coupled to a flight controller 126 and a video downlink radio 124.

Based on the collected data generated from operating one or more of such sensors, the flight controller can be configured to operate one or more propellers/motors and gimbal devices for navigation/flight of the counter-attack UAV based on a detected position or flight path of at least one target aerial vehicle.

The counter-attack UAV 102a can further comprise a wireless communication device, such as an RF radio 124 (e.g., Mobilicom software defined radio or other similar radio), that can wirelessly receive the command data from the external aerial vehicle detection system 100, and then can transmit the command data to the CPU 122 for processing. The radio 124 can be used to communicate a video feed, captured by the optical sensor(s) 119, back to the external aerial vehicle detection system 100 (or to another external computer system, or even to a manually-monitored display).

Based on the received command data, the counter-attack UAV 102a can operate autonomously to fly in a direction toward the detected position of the target aerial vehicle 104a to intercept the position or flight path of the target aerial vehicle 104a. More specifically, the counter-attack UAV 102a can comprise a flight controller 126 coupled to the CPU 122 for receiving command signals associated with the command data processed by the CPU 122. The flight controller 126 can then control the various components of the counter-attack UAV, such as rotor assemblies (e.g., see rotor assembly 128), gimbals or gimbal assemblies, and any other components or systems. The rotor assemblies can each comprises an electronic speed controller 130 and a motor/propeller 132 that causes the counter-attack UAV 102a to operate autonomously in flight. Thus, the CPU 122, the flight controller 126, and the rotor assemblies 128 can define a flight control system 133 that is operable to facilitate flight of the counter-attack UAV 102a to intercept the target aerial vehicle 104a, as further described herein.

Updated command data can be continuously communicated to the counter-attack UAV 102a so that the flight controller 126 can control flight of the counter-attack UAV 102a, as corresponding to a tracked flight path or position of the target aerial vehicle 104a. In this manner, the counter-attack UAV 102a can intercept the target aerial vehicle 104a, and can then neutralize the target aerial vehicle 104a with an aerial vehicle capture countermeasure 134a (e.g., a deployable net) coupled to the counter-attack UAV 102a, as further exemplified below regarding FIGS. 4A-8.

The optical sensors 119 (and/or the other sensors 120) and the CPU 122 can define an on-board aerial vehicle detection system 137 that is operable to detect the target aerial vehicle 104a on its own, in one example (e.g., without the assistance of an external aerial vehicle detection system). Thus, the counter-attack UAV 102a can detect the target aerial vehicle 104a (assuming it is within range), and then the CPU 122 can generate command data, which it can then transmit signals associated with the command data to the flight controller 126 to facilitate flight of the counter-attack UAV to intercept the target aerial vehicle 104a. Such on-board aerial vehicle detection system 137 can be operated in conjunction with the external aerial vehicle detection system 100 to track a dynamic flight position of the target aerial vehicle 104a, so that if the external aerial vehicle detection system 100 is unable to do such, then the on-board aerial vehicle detection system 137 can continue to such on its own as a back-up detection system.

Concurrently (or alternatively) before the counter-attack UAV 102a departs from a grounded position toward the target aerial vehicle 104a, command data from the external aerial vehicle detection system 100 can be processed by the CPU 122 of the counter-attack UAV 102a to control a pointing position of the optical sensor(s) 119 to "tell" the counter-attack UAV 102a where to "look" in airspace to find the target aerial vehicle 104a, in one example. Specifically, one of the optical sensors 119 can be rotatably mounted by one or more gimbal device(s) 138 to a flight body or platform of the counter-attack UAV 102a. The CPU 122 can then transmit control signals to gimbal controller(s) that control operation of the gimbal device(s) 138 (e.g., 3-axis gimbals) to establish and control a pointing position of the optical sensor (i.e., to point the camera toward the detected target aerial vehicle). As long as the target aerial vehicle 104a is within a detection range of the camera (e.g., up to 150 m, or more in some examples), the counter-attack UAV 102a can detect and track the position of the target aerial vehicle 104a on its own and without the assistance of the external aerial vehicle detection system 100, if necessary.

In some examples, the other sensors 120 can comprise one or more radar device(s), such as compact phased array radars and automotive radars. Small phase array radar systems, such as the Echodyne Mesa-X7, Fortem Technologies TrueView R20, and automotive radar systems like the Delphi Automotive Radar, can be incorporated in the counter-attack UAV 102a, which have a range of more than 200 m for small targets, such as small consumer drones (e.g., DJI Phantom 4). A radar array could also be used as a detection sensor of the external aerial vehicle detection system 100 for detection of a target aerial vehicle.

In some examples, in cases where the external aerial vehicle detection system 100 is unable to detect the target aerial vehicle 104a (e.g., due to weather, or intermittent signal losses), the counter-attack UAV 102a may be able to utilize its components (FIG. 3) to detect, track, and intercept the target aerial vehicle 104a. In such instances where the external aerial vehicle detection system 100 is not present or is usable, a number of counter-attack UAVs can be positioned around the airspace area A, such that their respective camera(s) are pointed in directions of interest. And, in response to detection of an incoming target aerial vehicle, the counter-attack UAV(s) can then autonomously detect, classify, track, intercept, and neutralize the target aerial vehicle (that is within the FOV and range of the on-board camera(s), as further discussed herein in various examples).

In some examples where the aerial vehicle capture countermeasure comprises a net (e.g., FIGS. 1, 4A-7), the counter-attack UAV 102a can support or carry a net control and deployment system comprising a net controller 140 operatively coupled to the CPU 122, a release device 142 and a restraint device 144, which are each operatively coupled to a net assembly 146 (e.g., the aerial vehicle capture countermeasure 134a of FIGS. 1 and 4A). The net assembly 146 can be coupled to a flight body or platform of the counter-attack UAV 102a via a net/UAV interface device 148, such as a quick-release device or other coupling device. As further exemplified below regarding FIGS. 4A-6C, the net controller 140 can be operated to control the restraint device 144 to facilitate moving the net assembly 146 from a folded or stowed position to a deployed position. Once the target aerial vehicle 104a is captured, for instance (FIG. 1), a force sensor 150 (coupled to the net assembly 146) can sense the fact that the target aerial vehicle has been captured due to the mass of the captured target aerial vehicle 104a that pulls on the counter-attack UAV 102a due to gravity and air drag. The force sensor 150 may transmit a signal to the CPU 122 accordingly (or to the net controller 140), and then the net controller 140 can be operated to actuate the release device 142 to release the net assembly 146 and the captured target aerial vehicle 104a at a particular location. This net control and deployment system is further exemplified and described below regarding FIGS. 4A-6C, including a number of components that can be used to achieve the above functionality.

The various components shown in FIG. 3 can be supported by or about a flight body 201 (FIG. 4A) of the counter-attack UAV 102a (and other counter-attack UAVs discussed herein). The flight body 201 can comprise a flight body, or a portion thereof, that structurally supports the components discussed regarding FIG. 3 (and that also supports a battery powering some or all of the components).

As illustrated in FIG. 1, and in one example, once the departed counter-attack UAV 102a is flown within a certain distance of the target aerial vehicle 104a (e.g., 10-150 m), such that the target aerial vehicle 104a is within a FOV 136a of the optical sensor(s) 119, the counter-attack UAV 102a may utilize the optical sensor(s) 119 to continuously track the position of the target aerial vehicle 104a for interception and neutralization purposes. For example, a particular optical sensor can comprise a video camera, mounted on a gimbal device (supported and operated by the counter-attack UAV 102a), that can be operated to identify and track the target aerial vehicle 104a, similarly as discussed above regarding the detection sensors of the external aerial vehicle detection system 100. For instance, a Kalman filter (or another variation of a Bayesian filter) can be executed as an algorithm by a processor of the CPU 122, and that uses digital signals generated by the video camera to estimate and predict the velocity, position, and orientation of the particular target aerial vehicle, and then executes a feedback control loop that autonomously and continuously adjust the gimbal device to keep the target aerial vehicle centered about the FOV 136a of the video camera, for instance. Such camera could be equipped with a long or medium focus telephoto lens to maximize the distance at which a target aerial vehicle may be identified and tracked at ranges up to 150 m to 300 m, in some examples, but at the cost of reducing the FOV of the camera. However, because the external aerial vehicle detection system 100 can transmit command data associated with a detected position of the target aerial vehicle 104a to the counter-attack UAV 102a, a narrower FOV can be acceptable in some instances, if it means the on-board camera has a longer range of detection and tracking capabilities. This principle is similarly true for the target aerial vehicle 104b being within a FOV 136b of the optical sensor(s) 119, wherein the counter-attack UAV 102b (or 102c) may utilize the optical sensor(s) 119 to continuously track the position of the target aerial vehicle 104b for intercepting a target aerial vehicle.

In some examples, the counter-attack UAV 102a (and 102b, 102c) can be equipped with an optical sensor or camera (e.g., 119) having a narrow band pass filter, and accompanied by an optical frequency matched illumination source (e.g., high-power LED). The LED can be directed to illuminate the target aerial vehicle 104a, while reducing background contributions, so that the camera and filter can better detect and track the target aerial vehicle 104a. Such on-board camera and narrow band pass filter can also be used to detect only that frequency of light illuminated onto a target aerial vehicle by an illumination device 116a of the external aerial vehicle detection system 100, as initially mentioned above regarding the description of FIG. 1.

In some examples, each counter-attack UAV exemplified herein can utilize Visual Inertial Odometry (VIO) technology to assist with flying a path based on landmarks alone without the aid of GPS. VIO technology is the fusion of a monocular camera (or stereo tracked landmarks) and an IMU to lessen inherent drift of the IMU alone. It has been recently shown by Qualcomm Research (and others) that a drone can have less than 1% drift over a flight path of 650 m without the aid of GPS, when utilizing VIO technology. This allows for motion planning and obstacle mapping. Therefore, the counter-attack UAVs discussed herein can implement this VIO technology (along with a high resolution video (e.g., 4K), other low-resolution cameras, dual band Wi-Fi, GNSS, IMU, and a barometer sensor) to "track"

a designated target aerial vehicle in which a swarm of counter-attack UAVs can follow its target aerial vehicle at some fixed distance and will navigate obstacles that may block its flight path. In some examples, each counter-attack UAV can utilize GPS-VIO fusion technology to assist with navigation in situations where GPS signals are intermittent (and therefore accurate satellite positioning is unavailable or inaccurate). In this scenario, each counter-attack UAV can comprise a sensor fusion position estimator (e.g., as part of the on-board CPU) to determine and/or update an accurate position. The sensor fusion position estimator can receive data from the on-board GPS device (intermittent signal), on-board camera(s), and an IMU. In this approach, a Kalman filter may be used to combine information from GPS and VIO when GPS is available, thus minimizing trajectory errors computed using VIO along in regions where only VIA is available. For this purpose Kalman filters may be used to estimate the state of the system (e.g. position, and speed) and fuse data obtained using different methods, such as GPS and VIO. Other approaches, such as complementary filters, or Bayesian/Markov methods, may also be used to fuse data obtained from different sensing systems and methodologies.

Figure 4D:
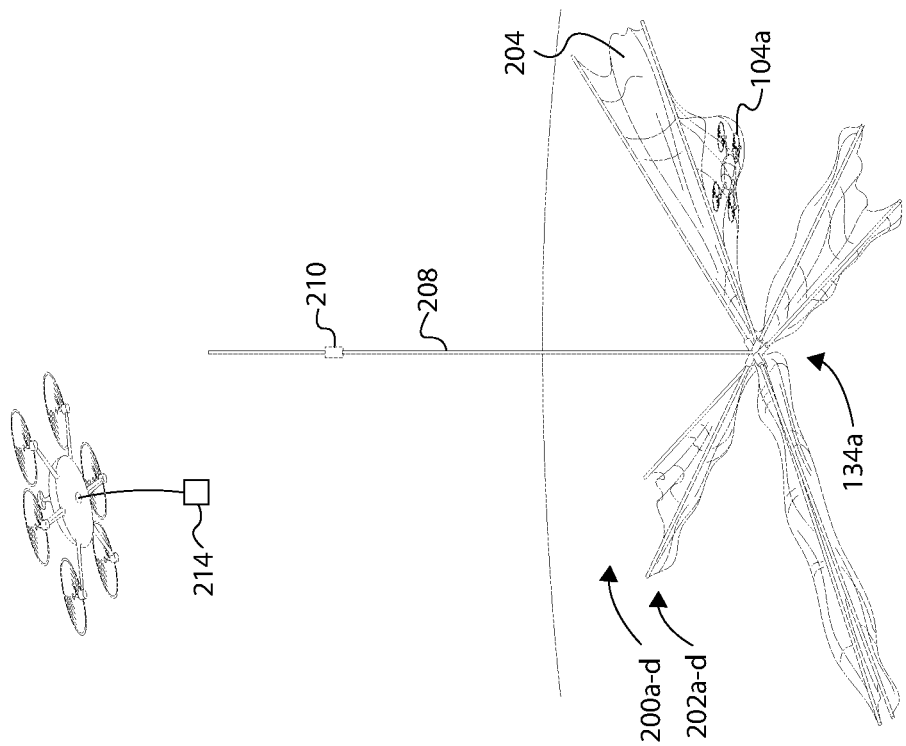
FIG. 4D illustrates the counter-attack UAV of FIG. 4A, showing the aerial vehicle capture countermeasure and the captured target aerial vehicle being released by the counter-attack UAV.
Figure 4C:
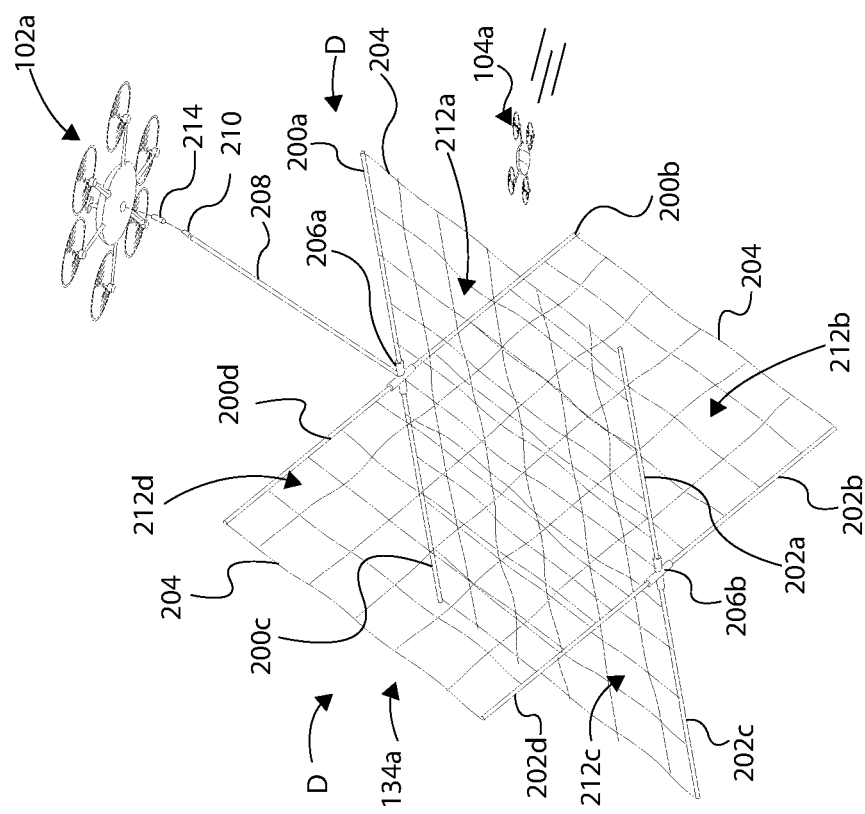
FIG. 4C illustrates the counter-attack UAV of FIG. 4A, showing the aerial vehicle capture countermeasure in the deployed position, and ready to capture a target aerial vehicle.

FIGS. 4A-4D show a system and method of intercepting and neutralizing the target aerial vehicle 104a in accordance with one example of the present disclosure. As shown in FIG. 4A, the counter-attack UAV 102a comprises or supports the aerial vehicle capture countermeasure 134a (see also FIG. 1) in the form of a deployable net assembly that is operable between a stowed or folded position F (FIGS. 1 and 4A) and a deployed position D (FIG. 4C). In the folded position F, the aerial vehicle capture countermeasure 134a can be arranged in a low-drag configuration (detailed below) to minimize drag forces on the aerial vehicle capture countermeasure 134a as the counter-attack UAV 102a is in flight. In response to the counter-attack UAV 102a intercepting the target aerial vehicle 104a (e.g., being in close proximity), the aerial vehicle capture countermeasure 134a can be quickly deployed near or along a predicted or known flight path of the target aerial vehicle 104a to capture the target aerial vehicle 104a in the aerial vehicle capture countermeasure 134a, thereby neutralizing the target aerial vehicle 104a by entangling rotors and/or body of the target aerial vehicle 104a in the netting of the aerial vehicle capture countermeasure 134a.

More specifically, the aerial vehicle capture countermeasure 134a can comprise a plurality of upper support members 200a-d and a plurality of lower support members 202a-d coupled together by at least one flexible entangling element, such as a net 204 (e.g., a monofilament gill net). The support members 200a-d and 202a-d can be rigid, yet light-weight structural support members, such as relatively thin (¼" diameter) and long (4-12 feet) fiberglass or carbon fiber epoxy rods, for instance.

As best shown in FIGS. 4B and 4C, the aerial vehicle capture countermeasure 134a can comprise an upper deploy mechanism 206a that pivotally supports inner or proximate or first ends of the upper support members 200a-d, and can comprise a lower deploy mechanism 206b that pivotally supports inner or proximate or first ends of the lower support members 202a-d. In one example, a primary support member 208 can be coupled to the upper deploy mechanism 206a and the counter-attack UAV 102a to support the aerial vehicle capture countermeasure 134a from the flight body 201 of the counter-attack UAV 102a, and to assist with positioning the net 204 away from the counter-attack UAV 102a (to prevent accidental tangling of the net with the rotors of the counter-attack UAV 102a). In one example, the primary support member 208 can comprise a light-weight rigid or semi-rigid rod. Alternatively, the primary support member 208 could be replaced with a flexible tether or filament, assuming the weight of the aerial vehicle capture countermeasure 134a is heavy enough to remain disposed generally below and/or behind the counter-attack UAV 102a to prevent accidental tangling.

The upper and lower deploy mechanisms 206a and 206b can be housings or hubs comprised of durable, light-weight material, such as plastic or aluminum, and can comprise various configurations and functionality to support and facilitate deployment of the respective support members 200a-d and 202a-d. For instance, inner ends of each support member 200a-d can be pivotally coupled to the upper deploy mechanism 206a by pins (not shown) that allow each upper support members 200a-d to pivot downwardly approximately 90 degrees from the folded position F to the deployed position D (as would also be the case with the lower deploy mechanism 206b). Alternatively, an elastic cord could be coupled to the upper deploy mechanism 206a and then through elongate openings of each support member 200a-d, and then coupled to ends of each upper support members 200a-d to generate a downward pulling force on the support members in response to being released from each other, so that each upper support member 200a-d is pulled or snapped into place while moving to the deployed position D.

In one example, a net restraint device 210 can be operably coupled between the counter-attack UAV 102a and the aerial vehicle capture countermeasure 134a. When in the folded position F, a tether (or other coupling device, like a removable/movable pin or clip) can bundle together the upper and lower support members 200a-d and 202a-d and the net 204. The net restraint device 210 can be operated or actuated by a controller of the counter-attack UAV 102a to pull on the tether to release the upper and lower support members 200a-d and 202a-d from being bundled together. The net restraint device 210 could be an electrically operated servo motor or other device operable to release or move a restraint device that bundles together the upper and lower support members 200a-d and 202a-d, for instance. Once released, gravity and/or air drag forces can cause the upper and lower support members 200a-d and 202a-d to downwardly pivot relative to respective deploy mechanisms 206a and 206b until they are positioned or locked into the deployed position D of FIG. 4C (a wind force may also assist to pull down the support members 200a-d and 202a-d). Such deployment causes the net 204 to unfold or expand to its deployed position, because the lower support members 202a-d pull the net 204 downwardly away from the upper support members 200a-d due to gravity (and also maybe a present wind force).

Such actuation to deploy the aerial vehicle capture countermeasure 134a can be effectuated autonomously by the CPU 122 that can transmit a deployment signal to a controller (not shown) that controls actuation of the net restraint device 210. The CPU 122 can be configured to transmit such deployment signal based on the detected proximity of the target aerial vehicle 104a relative to the counter-attack UAV 102a. For instance, if one or more sensors (e.g., 119a-n and/or 120a-n) detect that the target aerial vehicle 104a is approximately 5 m away and headed due North at 5 m/s with a constant altitude gain, the CPU 122 can cause the flight controller 126 to fly the counter-attack UAV 102a (and its aerial vehicle capture countermeasure) to be positioned just above a flight path of the target aerial vehicle 104a, and in approximately 5 seconds of flight time to intercept the target aerial vehicle 104a. Accordingly, just a few seconds before "intercepting" the target aerial vehicle 104a, the CPU 122 can transmit a deployment signal to the net restraint device 210 to deploy the aerial vehicle capture countermeasure 134a to the deployed position D. The aerial vehicle capture countermeasure 134a could then quickly deploy in approximately 1-2 seconds to cover a relatively large area of airspace, sufficient to cause the target aerial vehicle 104a to fly into the net 204, such that its rotors and/or body gets entangled in the filaments of the net 204, thereby capturing the target aerial vehicle 104a, and thereby neutralizing it. This can all occur autonomously via the CPU 122 (as described above), such that no external control or manual control is required to intercept the target aerial vehicle 104a with the counter-attack UAV 102a, and then to deploy the aerial vehicle capture countermeasure 134a to capture the target aerial vehicle 104a. Providing autonomous launch of the counter-attack UAV 102a and interception with the target aerial vehicle 104a, as well as autonomous deployment of the aerial vehicle capture countermeasure 134a, can be advantageous in many cases due to the agility and speed of many target aerial vehicles, where rapid interception and neutralization are needed. Of course, however, launch, operation and deployment of the counter-attack UAV 102a and a corresponding aerial vehicle capture countermeasure via manual or piloted systems is contemplated herein. With manned monitoring systems that utilize human monitoring to detect/track a target aerial vehicle, and then manned interaction or commands to deploy an aerial vehicle to intercept and neutralize the target aerial vehicle, such can be used when such rapid neutralization is not required. However, in those situations where time is of the essence, examples of the present disclosure provide autonomous detection and tracking of a target aerial vehicle with an aerial vehicle detection system, and then autonomous communication to one or more counter-attack UAV(s), and then autonomous interception and neutralization of the target aerial vehicle with the one or more counter-attack UAV(s), all within just a few minutes (or even a few seconds) and without human intervention or interaction, as exemplified here with the examples discussed regarding FIGS. 1-4D.

As illustrated in FIG. 4C, when in the deployed position D the aerial vehicle capture countermeasure 134a can define a plurality of capture zones 212a-d each extending in different directions from each other to define a three-dimensional zone of capture. The capture zones 212a-d can be generally rectangular shaped and have planar capture areas extending 90 degrees relative to adjacent capture zones (like a cross or plus sign when viewing from above or below). Thus, a generally 360 degree zone of capture can be defined by the outer boundaries of the capture zones 212a-d. Therefore, regardless of the particular rotational position of the aerial vehicle capture countermeasure 134a, at least one capture zone 212a-d may always be in a position to intercept the target aerial vehicle 104a. This increases the likelihood that the target aerial vehicle 104a will be captured in the net 204, while not necessarily controlling the rotational position of the aerial vehicle capture countermeasure 134a. This also provides a low-drag configuration because of the plus-shape configuration providing a symmetrical net assembly having capture zones extending orthogonally relative to one another or adjunct zones, which minimizes wind drag forces acting on the aerial vehicle capture countermeasure 134a.

Once the target aerial vehicle is captured, the aerial vehicle capture countermeasure 134a (and the captured target aerial vehicle 104a) can be transported and released at a particular drop zone or location, such as away from populated areas, as illustrated in FIG. 4D. To achieve this, a release mechanism 214 can be coupled between the counter-attack UAV 102a and the aerial vehicle capture countermeasure 134a, and can be operated to release the aerial vehicle capture countermeasure 134a from the counter-attack UAV 102a when desired or programmed. The release mechanism 214 can be communicatively coupled to the CPU 122, which can cause transmission of a control signal to the release mechanism 214 to actuate a release device that separates the aerial vehicle capture countermeasure 134a from the counter-attack UAV 102a. Any suitable mechanical and/or electrical release mechanism can be incorporated that separates two bodies or parts from being coupled to each other, such as a parachute 3-ring release system, or similar approach using a wire activated quick release or pin-in-hole release device.

Once dropped at a particular location, the aerial vehicle capture countermeasure 134a and the captured target aerial vehicle 104a can then be retrieved by an individual based on a tagged position of the drop zone (which can be programmed or recorded by the CPU 122 and then transmitted accordingly). The target aerial vehicle 104a can be removed and the aerial vehicle capture countermeasure 134a can be re-used with the same or another counter-attack UAV for another operation.

In some examples, the deployed aerial vehicle capture countermeasure 134a can be autonomously returned to the folded position F in instances where the target aerial vehicle 104a was not captured. In this example, the net restraint device 210 can be operated to retract a tether (or other device) coupled to ends of the support members that folds the support members of the aerial vehicle capture countermeasure 134a back to the folded position F.

In some examples, a human operator can control of the counter-attack UAV 102a to operate its flight and deployment of the aerial vehicle capture countermeasure 134a to capture the target aerial vehicle 104a. A live video feed can be viewed by the human operator, and a remote control can be used to control the counter-attack UAV 102a. However, human reaction time may not be as seamless or timely as compared to the autonomous tracking of the target aerial vehicle, and the autonomous navigation of the counter-attack UAV for interception and neutralization purposes.

In another example, a particular aerial vehicle capture countermeasure can include just the upper support members (e.g., 200a-d), and a net coupled laterally between the upper support members (e.g., netting extending orthogonal to the direction of a tether coupled to the counter-attack UAV 102a). A plurality of tendrils or individual filaments can extend from the net and/or the upper support members to generate a three-dimensional capture zone or area trailing behind the counter-attack UAV. Such upper support members can be pulled generally orthogonal to the direction of flight (subject to wind resistance) and oriented orthogonal to each other, such as in FIG. 4C. In this example, dozens of such tendrils, being many meters long (e.g., up to 30 m or more), can be dragged behind the support members. This can provide a very low-drag, three-dimensional capture zone, because the ends of the tendrils tend to flutter or drift in the wind in a sporadic manner to define a zone of capture (much like tendrils of a jellyfish). In this manner, the counter-attack UAV can be operable to trail behind a detected target aerial vehicle at a velocity that it passes along or nearby the target aerial vehicle close enough so that the tendrils get sucked into or engulfed by the rotors of the target aerial vehicle.

The net 204 (and other nets or filament elements discussed herein) can be manufactured as a number of different high-strength filaments. For instance, high-strength ultrahigh molecular weight polyethylene (UHMWPE) fibers, such as Dyneema® produced by DSM, or Spectra® produced by Honeywell (i.e., monofilaments) can be utilized, which use long molecular chains to transfer loads within individual fibers. Other types will be apparent to those skilled in the art. Various pound test and mesh sizes can be used, depending on the application, such as, but not being limited to, 1.5-pound test and 2.25 square inch mesh may be suitable to capture any number of available UAVs, for instance. Some nets may have knots where they intersect, and others may be knotless netting that utilizes four-strand braiding techniques that eliminate knots. The elimination of knots reduces drag and improves handling during deployment and stowage of a particular net, such as the net 204 and others discussed herein.

The strength of the net required to capture one or more target aerial vehicles will ultimately determine the type of filament needed. Based on the type of filament and its diameter, and based on mesh size and overall net coverage, it is necessary to balance aerodynamic drag at a given angle to ensure that the net does not deploy and then trail too far behind and horizontal from the counter-attack UAV when in tow and deployed. One or more counterweights could be used to prevent such effect by being coupled to the net or individual strands or filaments.

Various input parameters are taken into consideration when solving for equations of motion of the counter-attack UAV 102a towing the aerial vehicle capture countermeasure 134a to intercept the target aerial vehicle 104a. For instance, the input parameters associated with the counter-attack UAV 102a can be as follows: gravitational acceleration; drag coefficient; frontal area; air density; mass; maximum thrust; and initial position and velocity. The particular drag coefficient of the aerial vehicle capture countermeasure 134a is also taken into consideration when solving for equations of motion to intercept the target aerial vehicle 104a.

FIGS. 5A and 5B illustrate a system for supporting the counter-attack UAV 102a (or other counter-attack UAVs discussed herein) and the aerial vehicle capture countermeasure 134a while in a grounded position. The system can include a pedestal 216 that can be supported by a support structure or ground surface, and that can have a platform or deck 218 upon which the counter-attack UAV 102a can be supported while in the grounded position. The pedestal 216 can be as tall as or taller than a length of the aerial vehicle capture countermeasure 134a so that it may hang appropriately from the counter-attack UAV 102a. The platform 218 can be generally flat and can comprise a U-shaped profile to accommodate the hanging aerial vehicle capture countermeasure 134a through a slot formed in the platform 218, while supporting the flight body of the counter-attack UAV 102a. In response to detecting the target aerial vehicle 104a (as detailed above), the counter-attack UAV 102a can depart from the pedestal 216 while freely dragging or towing the aerial vehicle capture countermeasure 134a in the folded position F (FIG. 5B).

The pedestal 216 can position a camera or other sensor of the counter-attack UAV 102a at a height above the ground, for instance, to allow the camera to be able to monitor airspace for possible target aerial vehicles. This is advantageous because most cameras are mounted below horizontal and below the rotors of a UAV, for instance, and cannot always look upwardly while on the ground. A power source (not show) may be associated with the platform 218 and electrically coupled to the counter-attack UAV 102a for continuously powering the counter-attack UAV 102a when grounded. Various information or data connections can also be supplied to the counter-attack UAV 102a as carried by the pedestal 216. Indeed, after being grounded and coming to rest upon the platform 218, the counter-attack UAV 102a can be connected to power and/or data lines. The counter-attack UAV 102a can also be operable to "return home" to the pedestal 218 in instances where the aerial vehicle capture countermeasure 134a was not deployed.

FIGS. 6A-6C show a system and method of intercepting and neutralizing a target aerial vehicle 104b in accordance with one example of the present disclosure. As shown in FIG. 6A, the counter-attack UAV 102c comprises or supports an aerial vehicle capture countermeasure 134c in the form of a deployable net assembly that is operable between a stowed or folded position F (FIG. 6A) and a deployed position D (FIG. 6C). In the folded position F, the aerial vehicle capture countermeasure 134c can be arranged in a low-drag configuration to minimize drag forces on the aerial vehicle capture countermeasure 134c, and therefore the counter-attack UAV 102c, as the counter-attack UAV 102c is in flight. In response to the counter-attack UAV 102c intercepting the target aerial vehicle 104b (e.g., being in close proximity), the aerial vehicle capture countermeasure 134c can be quickly deployed near or along a predicted or known flight path of the target aerial vehicle 104b to capture the target aerial vehicle 104b in the aerial vehicle capture countermeasure 134c, thereby neutralizing the target aerial vehicle 104b by entangling the rotors and/or body of the target aerial vehicle 104b in the netting of the aerial vehicle capture countermeasure 134c.

More specifically, the aerial vehicle capture countermeasure 134c can comprise a pair of radial support members 336a and 336b coupled together by at least one flexible entangling element, such as a net 305 (e.g., a monofilament gill net). The radial support members 336a and 336b can be flexible, light-weight rods or members, such as fiberglass, that can each be folded or wrapped around themselves and each other (and wrapping the net) when in the folded position in FIG. 6A. The radial support members 336a and 336b can be relatively thin (¼" diameter) and long (e.g., 20 or more feet in circumference).

A net restraint device 310 can be operably coupled between the counter-attack UAV 102c and the aerial vehicle capture countermeasure 134c. Therefore, when in the folded position F, a tether (or other coupling device, like a removable/movable pin or clip) can bundle together the upper and lower radial support member 336a and 336b (and the net 305). The net restraint device 310 can be operated or actuated by a controller of the counter-attack UAV 102c to pull on the tether to release the upper and lower radial support members 336a and 336b from being bundled together. The net restraint device 310 could be an electrically operated servo motor or other device operable to release or move a restraint device that bundles together the upper and lower radial support members 336a and 336b, for instance.

In the folded position, the radial support members 336a and 336b can each be folded in a manner such that they have stored energy as a result of them being flexible, wrapped or bundled fiberglass rods, for instance, and being folded upon themselves. Once released, the radial support members 336a and 336b automatically deploy or unwrap by releasing such stored energy, so that each radial support member 336a and 336b expands to a circular or oval shape, and separate from each other (limited by the size of the net 305) until they are positioned in the deployed position D shown in FIG. 6C. Such deployment causes the net 305 to automatically unfold or expand to its deployed position, because the lower radial support member 336b pulls down or outwardly the net 305 away from the upper radial support member 336a due to gravity (and also maybe a present wind force).

Such actuation to deploy the aerial vehicle capture countermeasure 134c can be effectuated autonomously by the CPU 122 (see e.g., FIG. 3) that can transmit a deployment signal to a controller (not shown) that controls actuation of the net restraint device 310. The CPU 122 can be configured to transmit such deployment signal based on the detected proximity of the target aerial vehicle 104b relative to the counter-attack UAV 102, similarly as described regarding the example of FIGS. 4A-4D.

As shown in FIG. 6C, when in the deployed position D the aerial vehicle capture countermeasure 134c can define a three-dimensional capture zone in the shape of a cylindrical region or net capture area. Thus, regardless of the particular rotational position of the aerial vehicle capture countermeasure 134c, a section of the cylindrically shaped netting may always be facing the target aerial vehicle 104b. This increases the likelihood that the target aerial vehicle 104b will be captured in the net 305, while not necessarily needing to control the rotational position of the aerial vehicle capture countermeasure 134c.

Once the target aerial vehicle is captured, the aerial vehicle capture countermeasure 134c (and the captured target aerial vehicle 104b) can be transported and released at a particular drop zone or location via a release mechanism 314 that can be coupled between the counter-attack UAV 102c and the aerial vehicle capture countermeasure 134c, similarly as described regarding the example discussed and shown in FIG. 4D.

In some examples, a human operator can control the counter-attack UAV 102c to operate its flight and deployment of the aerial vehicle capture countermeasure 134c to capture the target aerial vehicle 104. A live video feed can be viewed by the human operator, and a remote control can be used to control the counter-attack UAV 102c. However, human reaction time may not be as seamless or timely as compared to the autonomous tracking of the target aerial vehicle, and the autonomous navigation of the counter-attack UAV for interception and neutralization purposes.

In another example, an aerial vehicle capture countermeasure can include just one (deployable) radial support member (e.g., 336a), and a net and/or tendrils can be coupled thereto. In this example, dozens of tendrils, being many meters long (e.g., up to 30 m or more), can be dragged behind the support members. This can provide a very low-drag, three-dimensional capture zone, because the ends of the tendrils tend to flutter or drift in the wind in a sporadic manner to define a zone of capture (much like tendrils of a jellyfish). In this manner, the counter-attack UAV can be operable to trail behind a detected target aerial vehicle at a velocity that it passes along or nearby the target aerial vehicle close enough (e.g., less than 30 m) so that the tendrils get sucked into or engulfed by the rotors of the target aerial vehicle.

The counter-attack UAV 102c and the aerial vehicle capture countermeasure 134c can be supported by a platform or pedestal when in a grounded mode, and then operable to launch from the platform in response to detection of a target aerial vehicle, similarly as shown and described with reference to FIG. 5A.

Figure 7:
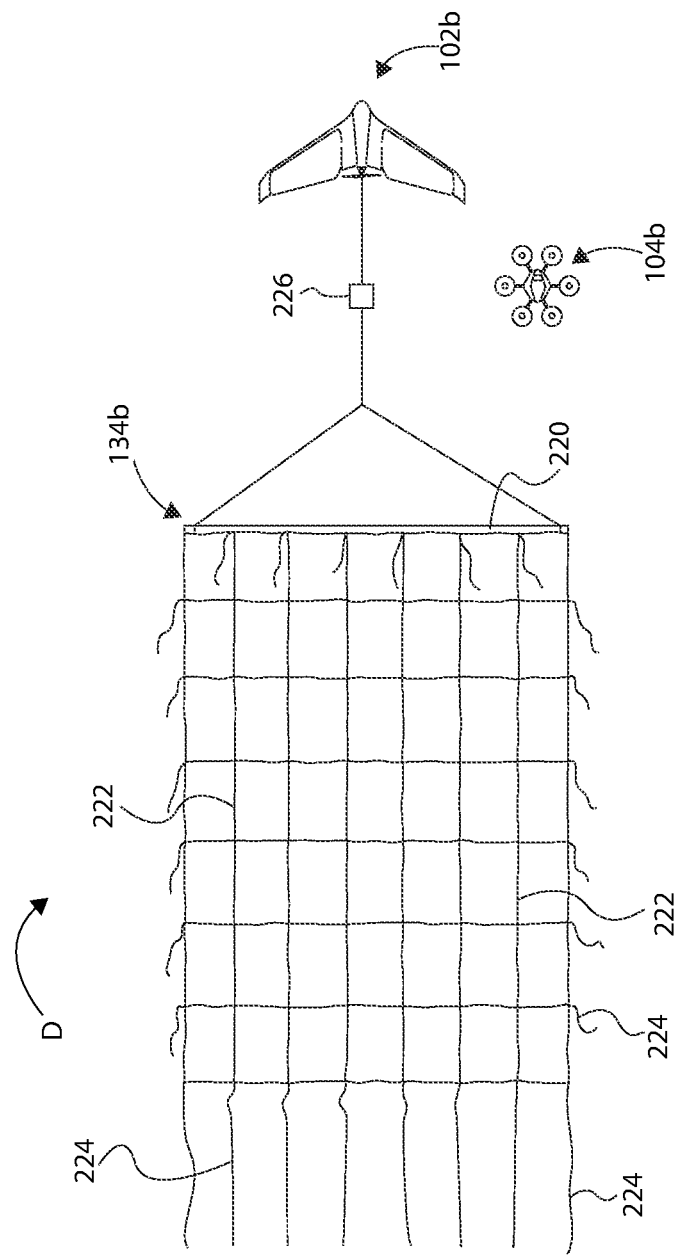
FIG. 7 illustrates a counter-attack UAV supporting and towing an aerial vehicle capture countermeasure in accordance with another example of the present disclosure.

FIG. 7 shows a system and method of neutralizing a target aerial vehicle 104b with a counter-attack UAV 102b in accordance with one example of the present disclosure. The counter-attack UAV 102b and the system it is operational with can have the same or similar features as the counter-attack UAVs and system described above with reference to FIGS. 1-6C to intercept and neutralize the target aerial vehicle 104b. However, in this example the counter-attack UAV 102b can be a fixed-wing unmanned aerial vehicle that is operable to neutralize the target aerial vehicle 104b. Specifically, an aerial vehicle capture countermeasure 134b can be coupled to the counter-attack UAV 102b for entangling rotors of the target aerial vehicle 104b during flight.

The aerial vehicle capture countermeasure 134b comprises a support member 220 (e.g., an aluminum or fiberglass rod) tethered to the counter-attack UAV 102b, and that supports at least one flexible entangling element, such as a net 222, which can have a plurality of tendrils 224 extending from various portions of the net 222. This provides a low-drag configuration to minimize drag forces on the aerial vehicle capture countermeasure 134b as the counter-attack UAV 102b is operated in airspace, because the net 222 effectively generates a two-dimensional capture zone towed directly behind the counter-attack UAV 102b.

In response to the counter-attack UAV 102b intercepting the target aerial vehicle 104b (e.g., being in close proximity to each other, as described herein), the aerial vehicle capture countermeasure 134b can be towed and positioned along a predicted or known flight path of the target aerial vehicle 104b to capture the target aerial vehicle 104b in the net 222 (or its tendrils 224), thereby entangling the rotors and/or body of the target aerial vehicle 104b to neutralize the target aerial vehicle 104b. This can reduce the need for highly accurate terminal tracking of the target aerial vehicle 104b, because the aerial vehicle capture countermeasure 134b can be relatively large compared to the footprint of the target aerial vehicle 104b, and because the counter-attack UAV 102b is only required to be nearby or proximate the target aerial vehicle 104b to capture it.

In this example, the net 222 can be a relatively large rectangular shape (e.g., 15 m by 50 m, or more), because the drag on the aerial vehicle capture countermeasure 134b would be relatively low due to its low-profile being towed along a general horizontal direction through airspace, and because the net 222 may be relatively lightweight for its size, as discussed herein. In some examples, the support member 220 can have an aerodynamic shape, such as an airfoil-shaped profile, which reduces drag forces and may assists to orient the net 222 along a desired orientation when being towed. Stabilizing devices, such as small airfoils or winglets, can be coupled to ends of the support member 220 to orient the aerial vehicle capture countermeasure generally perpendicular to the direction of flight, and to prevent spinning of the support member and the net while in flight. Alternatively, winglets and a stabilizing support member with winglets may also be installed on the trailing edge of the capture countermeasure to enhance stability and control of the orientation of the capture countermeasure.

In some examples, the support member 220 can be configured in a folded position and then deployable in a deployed position. In this manner, the support member 220 can be two or more collapsible support members, and the net 222 can be wrapped or bundled around such support members. Such support members can be oriented vertically during transport until the time at which the counter-attack UAV 102b deploys or releases a bundle of the support members, for instance. The net 222 could then automatically unfold or unwrap from the support member 220 due to drag forces exerted on the support member 220 and the net 222. Similarly, as described above, the counter-attack UAV 102b could trail and then pass the target aerial vehicle 104b in close proximity, and then the tendrils 224 and/or net 220 can be entangled in the rotors of the target aerial vehicle 104b (e.g., due to the suction force generated by rotors of the target aerial vehicle 104b).

Once captured, the aerial vehicle capture countermeasure 134b and the target aerial vehicle 104b can be transported and released at a particular drop zone, such as away from populated areas (e.g., see FIG. 4D). Thus, a release mechanism 226 can be coupled to the counter-attack UAV 102b and the aerial vehicle capture countermeasure 134b, and can be operated by the counter-attack UAV 102b to release the aerial vehicle capture countermeasure 134b from the counter-attack UAV 102b.

One primary advantage of various nets disclosed herein is the light-weight, low-drag features of the netting, which allows for a relatively large capture area or surface area. For instance, a 16-foot-wide and 550-yard-long net (covering 2,500 m$^2$) of 1.5-pound (or more) test monofilament, with about a 3-inch square average mesh size, can weight just 5 pounds. And, one support member being 16 feet long can weight just a few pounds or less itself, so the entire aerial vehicle capture countermeasure can weigh less than 10 pounds while covering 2,500 m$^2$ area of capture. Thus, a particular counter-attack UAV, having a 30-pound payload capacity, for instance, can readily tow such aerial vehicle capture countermeasure, even with a potentially high drag force (e.g., 10-20 pounds) when traveling at relatively high speeds to intercept a target aerial vehicle.

Figure 8:
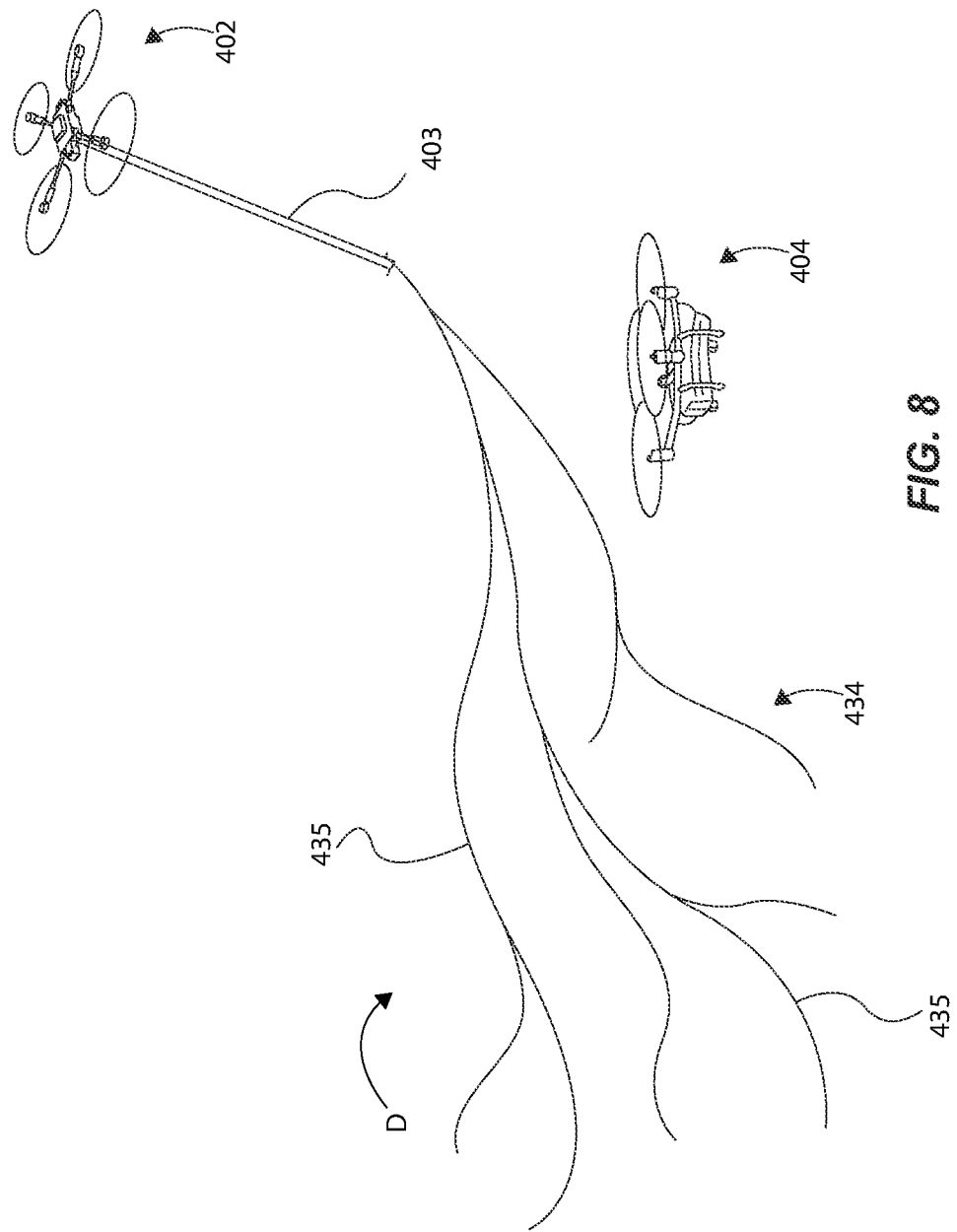
FIG. 8 illustrates a counter-attack UAV supporting and towing an aerial vehicle capture countermeasure in accordance with another example of the present disclosure.

FIG. 8 shows a system and method of intercepting and neutralizing a target aerial vehicle 404 with a counter-attack UAV 402 in accordance with one example of the present disclosure. The counter-attack UAV 402 can have the same or similar features as described with reference to the counter-attack UAVs described with reference to FIGS. 1-6C to intercept and neutralize the target aerial vehicle 404. Here, an aerial vehicle capture countermeasure 434 can be a plurality of tendrils 435 (i.e., not a net) coupled to the counter-attack UAV 402 for entangling rotors of the target aerial vehicle 404 during flight. One or more weights can be coupled to one or more tendrils 435 to help keep the tendrils 435 hanging from the counter-attack UAV 402, and to prevent them from accidentally tangling with the counter-attack UAV 402. Alternatively, as shown, a semi-rigid or rigid rod or other support member 403 can be coupled to the counter-attack UAV 402 and can extend downwardly from the counter-attack UAV 402 to support the tendrils 435 for the same purpose. In this configuration, the tendrils 435 can be deployed (from a stowed to a deployed position) from an elongate cavity through the support member 403 by sufficient wind forces, or by active actuation effectuated by the counter-attack UAV 402 that actuates a release device to release a bundle or collection of tendrils 435 in a suitable manner.

This tendril configuration can provide a low-drag capture mechanism that minimizes drag forces as the counter-attack UAV 402 is operated in airspace, because the drag forces on an individual strand or filament of a particular tendril is quite low because the free end is able to flutter or move in the wind without constraint.

Therefore, in response to the counter-attack UAV 402 intercepting the target aerial vehicle 404 (e.g., being in close proximity to each other, as described herein), the aerial vehicle capture countermeasure 434 can be towed and positioned along a predicted or known flight path of the target aerial vehicle 404 to capture the target aerial vehicle 404 in one or more tendrils 435, thereby entangling rotors of the target aerial vehicle 404 to neutralize the target aerial vehicle 404. The tendrils 435 can be a relatively long, such as 15 m to 50 m, or more, due to their lightweight properties and low-drag features.

The tendrils 435 can be configured in a bundled or stowed position in or about the flight body of the counter-attack UAV 402, and then deployable in a deployed position, as shown in FIG. 8. Once captured, the aerial vehicle capture countermeasure 434 and the target aerial vehicle 404 can be transported and released at a particular drop zone, such as away from populated areas (e.g., see FIG. 4D). Thus, a release mechanism can be coupled to the counter-attack UAV 402 and the aerial vehicle capture countermeasure 434, and can be operated by the counter-attack UAV 402 to release the aerial vehicle capture countermeasure 434 from the counter-attack UAV 402.

It should be appreciated that any number of shapes and configurations of netting and their supports could be implemented, such as circular or oval-shaped, polygon-shaped, irregular shaped, etc. In some examples, a plurality of counter-attack UAVs could even deploy a net having a three-dimensional zone of capture, such as the addition of tendrils, or even deploying a spherical net deployed with radial support members, for instance. In this example, at least one "net face" or surface area will always face a particular target aerial vehicle regardless of the rotational position of the net, which increases the chances of capturing the target aerial vehicle.

In the various examples discussed herein, one or more aerial theatre observer UAV(s) can be operated to hover or fly around a monitored area to assist with neutralizing a target aerial vehicle. For instance, high-performance aerial theatre observer UAV(s) can have a variety of sensors and devices discussed herein (e.g., optical cameras, gimbals, etc.) that can "observe" terminal tracking and neutralization of the target aerial vehicle, meaning that the aerial theatre observer UAV(s) can also track, in real-time, the target aerial vehicle and then can communicate collected data to one or more counter-attack UAV(s) and/or to the external aerial vehicle detection system 100. This system assists to provide track target aerial vehicle(s) where tracking may be intermittent or unavailable by the one or more counter-attack UAV(s) and/or to the external aerial vehicle detection system 100 (e.g., due to weather, detection range issues, birds, etc.). Human observers can also received data, such as live video feed, from such aerial theatre observer UAV(s) to observe the success or failure of neutralizing the target aerial vehicle, which can act as a back-up system if the target aerial vehicle avoids neutralization by the counter-attack UAV(s).

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A counter-attack unmanned aerial vehicle (UAV) for aerial neutralization of a target aerial vehicle, the counter-attack UAV comprising:
 a flight body;
 a flight control system that controls flight of the counter-attack UAV to intercept a detected target aerial vehicle; and
 an aerial vehicle capture countermeasure carried by the flight body and operable to capture the detected target aerial vehicle, the aerial vehicle capture countermeasure comprising at least one support member and at least one flexible entangling element supported by the at least one support member, the at least one support member comprising an elongate rod, the at least one support member and the at least one flexible entangling element being operable to passively move from a stowed position to a deployed position,
 wherein the at least one support member comprises at least one upper support member connected to an upper deploy mechanism and at least one lower support member connected to a lower deploy mechanism, the upper and lower deploy mechanisms being operable to facilitate the passive movement of the at least one upper support member and the at least one lower support member, and wherein the at least one flexible entangling element comprises a net coupling the at least one upper support member to the at least one lower support member.

2. The counter-attack UAV of claim 1, wherein the counter-attack UAV comprises at least one sensor configured to detect a position of the target aerial vehicle, the flight control system comprising a flight controller operable to control autonomous flight of the counter-attack UAV based on a detected position of the target aerial vehicle.

3. The counter-attack UAV of claim 1, wherein the flight control system comprises a central processing unit (CPU) and a flight controller in communication with one another, wherein the at least one sensor comprises a camera operable to detect a position of the target aerial vehicle, the camera operatively coupled to the CPU for processing data associated with the detected position to track a dynamic flight position of the target aerial vehicle, wherein the flight controller is configured to control autonomous flight of the counter-attack UAV to intercept the dynamic flight position of the target aerial vehicle.

4. The counter-attack UAV of claim 1, further comprising a release mechanism coupling the flight body to the aerial vehicle capture countermeasure, the counter-attack UAV operable to actuate the release mechanism to release the aerial vehicle capture countermeasure from the counter-attack UAV after capturing the target aerial vehicle to deliver the captured target aerial vehicle to a particular location.

5. The counter-attack UAV of claim 1, further comprising a wireless communication device supported by the flight body and communicatively coupled to an external aerial vehicle detection system, the communication device configured to receive command data from the external aerial vehicle detection system, the command data associated with the target aerial vehicle as detected by the external aerial vehicle detection system.

6. The counter-attack UAV of claim 5, further comprising at least one camera movably coupled to flight body, the at least one camera movable to establish and modify a pointing position, based on the command data received from the external aerial vehicle detection system, to detect and track the target aerial vehicle.

7. The counter-attack UAV of claim 1, wherein the at least one flexible entangling element is configured to disrupt operation of at least one rotary propeller device of the target aerial vehicle in response to the counter-attack UAV being in close proximity with the target aerial vehicle.

8. The counter-attack UAV of claim 7, wherein the at least one flexible entangling element comprises at least one of a net, filament, monofilament, braided filament, tendril, fiber, string, cord, strand, thread, rope, or wire.

9. The counter-attack UAV of claim 1, wherein the aerial vehicle capture countermeasure is operable by the counter-attack UAV between a folded position and a deployed position.

10. The counter-attack UAV of claim 9, wherein the at least one support member comprises a plurality of support members and the at least one flexible entangling element comprises at least one net coupled to the plurality of support members, wherein the plurality of support members and the at least one net are collapsible when in the folded position.

11. The counter-attack UAV of claim 10, wherein the plurality of support members and the at least one net define a plurality of net capture zones, when in the deployed position, each extending in different directions from each other to define a three-dimensional zone of capture defined by the aerial vehicle capture countermeasure.

12. The counter-attack UAV of claim 10, further comprising a restraint device coupled to the aerial vehicle capture countermeasure, and configured to maintain the aerial vehicle capture countermeasure in the folded position, wherein the counter-attack UAV is operable to actuate the restraint device to facilitate movement of the aerial vehicle capture countermeasure to the deployed position.

13. The counter-attack UAV of claim 10, wherein the plurality of support members comprises a first radial support member and a second radial support member, wherein the at least one net couples the first and second radial support members together to form a three-dimensional zone of capture defined by the aerial vehicle capture countermeasure.

14. A system for detecting and neutralizing a target aerial vehicle, the system comprising:
 a counter-attack unmanned aerial vehicle (UAV) comprising:
  a flight body;
  a flight control system that controls flight of the counter-attack UAV; and
  an aerial vehicle capture countermeasure carried by the flight body, the aerial vehicle capture countermeasure comprising a first support member and a second support member, and at least one flexible entangling element supported by the first support member and the second support member, the first support member and the second support member each comprising an elongate rod, the first support member, the second support member, and the at least one flexible entangling element being operable to passively move from a stowed position to a deployed position such that the first support member and the second support member are transverse to one another in the deployed position to define a plurality of net capture zones, an aerial vehicle detection system comprising at least one detection sensor operable to detect a target aerial vehicle, and operable to provide command data to the counter-attack UAV to facilitate interception of the target aerial vehicle by the counter-attack UAV;

wherein, in response to interception of the target aerial vehicle, the counter-attack UAV is operable to capture the detected target aerial vehicle with the aerial vehicle capture countermeasure.

15. The system of claim 14, wherein the command data comprises at least one of intercept data, aerial vehicle capture countermeasure deployment command data, target aerial vehicle detection data, counter-attack UAV control data, authorization to engage and capture data, or a combination thereof.

16. The system of claim 14, wherein the aerial vehicle detection system comprises an on-board aerial vehicle detection system comprising the at least one detection sensor configured to detect a position of the target aerial vehicle, the flight control system comprising a flight controller operable to control autonomous flight of the counter-attack UAV based on the detected position of the target aerial vehicle.

17. The system of claim 14, wherein the flight control system comprises a central processing unit (CPU) and a flight controller coupled to each other, wherein the at least one sensor comprises a camera operable to detect a position of the target aerial vehicle, the camera operatively coupled to the CPU for processing data associated with the detected position to track a dynamic flight position of the target aerial vehicle, wherein the flight controller is configured to control autonomous flight of the counter-attack UAV to intercept the dynamic flight position of the target aerial vehicle.

18. The system of claim 14, wherein the aerial vehicle capture countermeasure comprises at least one flexible entangling element configured to disrupt operation of at least one rotary propeller device of the target aerial vehicle in response to the counter-attack UAV being in close proximity with the target aerial vehicle.

19. The system of claim 14, further comprising a release mechanism coupling the flight body to the aerial vehicle capture countermeasure, the counter-attack UAV operable to actuate the release mechanism to release the aerial vehicle capture countermeasure from the counter-attack UAV after capturing the target aerial vehicle to deliver the captured target aerial vehicle to a particular location.

20. The system of claim 14, wherein the aerial vehicle detection system comprises an external aerial vehicle detection system, the external aerial vehicle detection system comprising at least one detection sensor operable to detect the target aerial vehicle and to provide command data to the counter-attack UAV to facilitate interception of the target aerial vehicle.

21. The system of claim 20, wherein the external aerial vehicle detection system is associated with a ground-based structure to monitor an airspace, wherein the at least one detection sensor comprises a plurality of detection sensors configured to detect at least one target aerial vehicle.

22. The system of claim 20, further comprising a plurality of counter-attack UAVs including the counter-attack UAV, wherein each counter-attack UAV is in communication with at least one of the aerial vehicle detection system associated with a ground-based structure or one or more other counter-attack UAVs, and wherein each counter-attack UAV comprises a deployable aerial vehicle capture countermeasure.

23. The system of claim 14, wherein the aerial vehicle capture countermeasure is operable by the counter-attack UAV between a folded position and a deployed position.

24. The system of claim 23, wherein the aerial vehicle capture countermeasure comprises a plurality of support members, including the first and second support members, and the at least on flexible entangling element comprises at least one net coupled to the plurality of support members, wherein the plurality of support members and the at least one net are collapsible when in the folded position.

25. The system of claim 24, wherein the plurality of net capture zones, when in the deployed position, each extend in different directions from each other to define a three-dimensional zone of capture defined by the aerial vehicle capture countermeasure.

26. The system of claim 25, wherein the elongate rod comprises a rigid or semi-rigid linear rod or a radial rod.

27. A method for aerial neutralization of a target aerial vehicle, comprising:
    detecting a target aerial vehicle;
    operating a counter-attack unmanned aerial vehicle (UAV) to intercept the target aerial vehicle;
    facilitating an aerial vehicle capture countermeasure to passively move from a stowed position to a deployed position, the aerial vehicle capture countermeasure comprising at least one upper support member connected to an upper deploy mechanism, at least one lower support member connected to a lower deploy mechanism, the upper and lower deploy mechanisms being operable to facilitate the passive movement of the at least one upper support member and the at least one lower support member from the stowed position to the deployed position, and at least one flexible entangling element comprising a net coupling the at least one upper support member to the at least one lower support member, wherein the at least one upper support member and the at least one lower support member each comprise an elongate rod; and
    capturing the target aerial vehicle with the aerial vehicle capture countermeasure carried by the counter-attack UAV.

28. The method of claim 27, wherein detecting the target aerial vehicle further comprises tracking a dynamic flight position with at least one sensor of an aerial vehicle detection system, wherein the aerial vehicle detection system comprises at least one of a detection sensor on-board the counter-attack UAV or a detection sensor remotely located from the counter-attack UAV.

29. The method of claim 27, further comprising communicating position data between a plurality of counter-attack UAVs, including the counter-attack UAV, each counter-attack UAV comprising a deployable aerial vehicle capture countermeasure.

30. The method of claim 27, further comprising establishing a pointing position of a camera of the counter-attack UAV to track the target aerial vehicle, the pointing position based on command data received from an aerial vehicle detection system.

31. The method of claim 27, further comprising transitioning the aerial vehicle capture countermeasure from a folded position to a deployed position to define a three-dimensional zone of capture for capturing the target aerial vehicle.

32. The method of claim 27, further comprising actuating a release mechanism coupling the counter-attack UAV to the aerial vehicle capture countermeasure to release the aerial vehicle capture countermeasure from the counter-attack UAV after capturing the target aerial vehicle to deliver the target aerial vehicle to a particular location.

33. The method of claim 27, wherein detecting the target aerial vehicle further comprises operating an optical sensor and a radar sensor each supported by the counter-attack UAV to detect a position of the target aerial vehicle.

34. The method of claim 27, wherein detecting the target aerial vehicle further comprises operating a plurality of detection sensors associated with a ground structure to generate position data associated with the target aerial vehicle, the method further comprising continuously communicating the position data to the counter-attack UAV.

35. The method of claim 27, wherein detecting the target aerial vehicle further comprises operating a plurality of detection sensors to generate position data associated with the target aerial vehicle, the method further comprising eliminating position data associated with one or more detection sensors based on a credibility hierarchy associated with the plurality of detection sensors.

36. A counter-attack unmanned aerial vehicle (UAV) for aerial neutralization of a target aerial vehicle, the counter-attack UAV comprising:

a flight body;

a flight control system that controls flight of the counter-attack UAV to intercept a detected target aerial vehicle; and an aerial vehicle capture countermeasure carried by the flight body and operable to capture the detected target aerial vehicle, the aerial vehicle capture countermeasure comprising at least one support member and at least one flexible entangling element supported by the at least one support member, the at least one support member comprising an elongate rod, the at least one support member and the at least one flexible entangling element being operable to passively move from a stowed position to a deployed position wherein the at least one flexible entangling element comprises tendrils operable to entangle rotors of the target aerial vehicle, and wherein the elongate rod is tethered to the counter-attack UAV on a first end and the tendrils extend from the elongate rod on a second end opposite the first end to prevent the tendrils from tangling with the counter-attack UAV.

\* \* \* \* \*